US012084629B2

(12) United States Patent
Dahlquist Howlett et al.

(10) Patent No.: US 12,084,629 B2
(45) **Date of Patent: *Sep. 10, 2024**

(54) SYNERGISTIC SURFACTANT PACKAGE FOR CLEANING OF FOOD AND OILY SOILS

(71) Applicant: ECOLAB USA INC., Saint Paul, MN (US)

(72) Inventors: Erin Jane Dahlquist Howlett, Saint Paul, MN (US); Renee Elizabeth Mueggenborg, Saint Paul, MN (US); Matthew Paul Molinaro, Saint Paul, MN (US)

(73) Assignee: ECOLAB USA INC., Saint Paul, MN (US)

(*) Notice: Subject to any disclaimer, the term of this patent is extended or adjusted under 35 U.S.C. 154(b) by 0 days.

This patent is subject to a terminal disclaimer.

(21) Appl. No.: 18/164,847

(22) Filed: Feb. 6, 2023

(65) Prior Publication Data

US 2023/0183607 A1 Jun. 15, 2023

Related U.S. Application Data

(63) Continuation of application No. 16/663,485, filed on Oct. 25, 2019, now Pat. No. 11,603,508.

(60) Provisional application No. 62/751,302, filed on Oct. 26, 2018.

(51) Int. Cl.

| | |
|---|---|
| ***C11D 1/12*** | (2006.01) |
| ***B08B 3/04*** | (2006.01) |
| ***B08B 3/08*** | (2006.01) |
| ***C11D 1/22*** | (2006.01) |
| ***C11D 1/72*** | (2006.01) |
| ***C11D 1/722*** | (2006.01) |
| ***C11D 1/83*** | (2006.01) |
| ***C11D 1/831*** | (2006.01) |
| ***C11D 17/00*** | (2006.01) |
| *C11D 1/00* | (2006.01) |
| *C11D 1/14* | (2006.01) |

(52) U.S. Cl.

CPC ................ *C11D 1/831* (2013.01); *B08B 3/08* (2013.01); *C11D 1/8305* (2013.01); *C11D 17/006* (2013.01); *C11D 1/008* (2013.01); *C11D 1/143* (2013.01); *C11D 1/146* (2013.01); *C11D 1/22* (2013.01); *C11D 1/72* (2013.01); *C11D 1/722* (2013.01); *C11D 2111/14* (2024.01)

(58) Field of Classification Search

CPC .. C11D 1/008; C11D 1/12; C11D 1/22; C11D 1/72; C11D 1/722; C11D 1/83; C11D 1/8305; C11D 11/0023; C11D 17/0047; B08B 3/04; B08B 3/08

See application file for complete search history.

(56) References Cited

U.S. PATENT DOCUMENTS

| | | | | |
|---|---|---|---|---|
| 5,035,826 | A | 7/1991 | Durbut et al. | |
| 5,437,686 | A | 8/1995 | Heffner et al. | |
| 5,736,496 | A | 4/1998 | Durbut et al. | |
| 6,479,449 | B1 * | 11/2002 | Mondin | C11D 3/2041 510/505 |
| 6,627,592 | B1 * | 9/2003 | Shamayeli | C11D 3/3947 510/303 |
| 11,603,508 | B2 * | 3/2023 | Dahlquist Howlett | C11D 17/041 |
| 2002/0055450 | A1 | 5/2002 | Rodrigues | |
| 2007/0225189 | A1 | 9/2007 | Dailey et al. | |
| 2008/0153983 | A1 | 6/2008 | Boeckh et al. | |
| 2014/0066352 | A1 | 3/2014 | Wang et al. | |
| 2014/0066353 | A1 | 3/2014 | Wang et al. | |
| 2014/0174478 | A1 * | 6/2014 | Letzelter | C11D 3/162 134/25.2 |
| 2017/0107463 | A1 * | 4/2017 | Sun | C11D 1/722 |
| 2018/0066208 | A1 | 3/2018 | Olson et al. | |
| 2018/0066213 | A1 | 3/2018 | Lo et al. | |
| 2018/0208876 | A1 | 7/2018 | Man et al. | |
| 2019/0330563 | A1 | 10/2019 | Man et al. | |

FOREIGN PATENT DOCUMENTS

| | | | | |
|---|---|---|---|---|
| EP | 0636687 | A2 | 2/1995 | |
| EP | 0672747 | B1 | 9/1995 | |
| GB | 1105231 | | 3/1968 | |
| WO | 03089563 | A2 | 10/2003 | |
| WO | WO 03/089563 | * | 10/2003 | C11D 17/04 |
| WO | WO 2009/125336 | * | 10/2009 | C11D 1/75 |

(Continued)

OTHER PUBLICATIONS

Cox et al., "Interactions Between LAS and Nonionic Surfactants", JAOCS, vol. 62, No. 7, pp. 1139-1143, Jul. 1985.

Malihi et al., "Evaluation of Physico-Chemical Interactions between Linear Alkylbenzene Slfonate (LAS) and Alcohol Ethoxylates", Tenside Surfactants Detergents, 5 pages, Apr. 2011.

(Continued)

*Primary Examiner* — Brian P Mruk

(74) *Attorney, Agent, or Firm* — McKee, Voorhees & Sease, PLC

(57) ABSTRACT

The disclosure relates a surfactant package for use in hard surface cleaning compositions, preferably floor cleaning compositions which pair an anionic linear alkyl sulfonate surfactant and a nonionic surfactant in a ratio of 1:1 to 9:1. This combination provides for synergistic cleaning of both proteinaceous food soils (red soils) and hydrocarbon-based oily soils (black soils) while also reducing foam produced by the composition. Synergistic nonionic surfactants include EO/PO alcohol alkoxylates or EO/PO fatty alcohol surfactants with a propylene oxide to ethylene oxide to ratio of greater than 1.

27 Claims, No Drawings

(56) References Cited

FOREIGN PATENT DOCUMENTS

| | | | | | |
|---|---|---|---|---|---|
| WO | 2012036703 | A1 | | 3/2012 | |
| WO | 2017156141 | A1 | | 9/2017 | |
| WO | WO 2017/156141 | | * | 9/2017 | ............... C11D 3/20 |
| WO | 2018039603 | A1 | | 3/2018 | |

OTHER PUBLICATIONS

International Searching Authority in connection with PCT/US2019/058002 filed Oct. 25, 2019, "The International Search Report and the Written Opinion of the International Searching Authority, or the Declaration", 15 pages, mailed Feb. 7, 2020.

* cited by examiner

SYNERGISTIC SURFACTANT PACKAGE FOR CLEANING OF FOOD AND OILY SOILS

CROSS-REFERENCE TO RELATED APPLICATIONS

This application is a Continuation Application of U.S. Ser. No. 16/663,485, filed Oct. 25, 2019, now U.S. Pat. No. 11,603,508, issued Mar. 14, 2023, which application claims priority under 35 U.S.C. § 119 to provisional application Ser. No. 62/751,302, filed Oct. 26, 2018, herein incorporated by reference in its entirety.

FIELD OF THE DISCLOSURE

The present disclosure relates to solid hard surface cleaning compositions and/or floor care compositions and a synergistic surfactant package for the same with medium to low foaming. Methods of making and using the compositions for the cleaning of hard surfaces and/or care of floors are also disclosed.

BACKGROUND OF THE DISCLOSURE

A challenge in formulating aqueous floor cleaning and/or floor care compositions are the use of abrasion-suction machines or automatic cleaning units, which require low foam stability and a low foam level. With high foaming compositions a foam cushion is formed in the dirty water tank. The float in the dirty water tank is thereby raised above the actual liquid level. Depending on the foam strength, this can lead to the disconnection mechanism being activated and interruption of the cleaning process.

Cleaning compositions which are commercially available usually contain combinations of anionic and/or nonionic surfactants and in some cases combinations with amphoteric surfactants as a surfactant base. When they are used in the above-mentioned automatic cleaning units, the formulator of cleaning compositions uses preferably, if not exclusively, surface-active compounds from the group of the nonionic surfactants. Anionic surfactants, which are preferable for their cleaning ability of both red (food) and black (oily) soils, are typically not considered because of their strong foam-forming properties.

Accordingly, the formulator must of necessity resort to less foaming nonionic surfactants sacrificing cleaning ability of some types of soils. It is an object of the disclosure to provide a hard surface cleaning composition that works on both red and black soils and has acceptable foaming characteristics. Most other surfactants/surfactant packages work on either red soil or black soil only.

The object of the present disclosure is accordingly to develop floor cleaning and/or care compositions which may be used without difficulty both manually and in automatic cleaning units, will clean both food and oily soils and whose cleaning performance is to be comparable with that of the known compositions based on anionic surfactants. Still other embodiments of the present disclosure will become apparent to those skilled in the art from the following detailed description, which shows and describes illustrative embodiments of the disclosure. Accordingly, the drawings and detailed description are to be regarded as illustrative in nature and not restrictive.

SUMMARY

The present disclosure in an embodiment relates a surfactant package for use in hard surface cleaning compositions. The disclosure pairs traditional anionic surfactants typically used in floor surface cleaning with a synergistic nonionic surfactant. The combination is preferably a linear alkyl sulfonate surfactant and a nonionic surfactant in a ratio of 1:1 to 9:1. Alpha olefin sulfonate or other branched chain surfactants did not exhibit synergy in the combinations. This combination provides for synergistic cleaning of both proteinaceous food soils (red soils) and hydrocarbon-based oily soils (black soils) while also reducing foam produced by the composition.

A preferred surfactant is a nonionic surfactant that is low foaming (foam height of less than 250 mL) and with a cloud point below room temperature (23° C.). More preferred is an EO/PO alcohol alkoxylate or EO/PO fatty alcohol surfactant with a propylene oxide to ethylene oxide to ratio of greater than 1, preferably 2:1.

The surfactant package may be formulated within a cleaning composition, such as a hard surface cleaner, a floor cleaner, a floor cleaner conditioner, or a degreaser. The cleaning composition may be formulated as a liquid, a foam, a thickened liquid, or a solid. For example, a concentrate composition can be formulated as a solid, e.g., a powder, block, tablet, pellet, granule, etc. The composition can further be formulated as a concentrate, or as a use solution. The composition is preferably a solid, neutral floor cleaner with a pH of 7-9.

The present disclosure further relates to a method for treating a surface with the composition, the method comprising applying the composition to the surface, allowing the composition to remain on the surface for a length of time, and wiping the surface.

Various embodiments of the present disclosure will be described in detail with reference to the drawings, wherein like reference numerals represent like parts throughout the several views. Reference to various embodiments does not limit the scope of the disclosure. Figures represented herein are not limitations to the various embodiments according to the disclosure and are presented for exemplary illustration of the disclosure.

DETAILED DESCRIPTION OF THE PREFERRED EMBODIMENT

The present disclosure relates to cleaning compositions and methods of employing the same. The embodiments of this disclosure are not limited to particular claimed compositions and conditions of use thereof, which can vary and are understood by skilled artisans. It is further to be understood that all terminology used herein is for the purpose of describing particular embodiments only and is not intended to be limiting in any manner or scope. For example, as used in this specification and the appended claims, the singular forms "a," "an" and "the" can include plural referents unless the content clearly indicates otherwise. Further, all units, prefixes, and symbols may be denoted in its SI accepted form.

Numeric ranges recited within the specification are inclusive of the numbers within the defined range. Throughout this disclosure, various aspects of this disclosure are presented in a range format. It should be understood that the description in range format is merely for convenience and brevity and should not be construed as an inflexible limitation on the scope of the disclosure. Accordingly, the description of a range should be considered to have specifically disclosed all the possible sub-ranges as well as individual numerical values within that range (e.g. 1 to 5 includes 1, 1.5, 2, 2.75, 3, 3.80, 4, and 5).

So that the present disclosure may be more readily understood, certain terms are first defined. Unless defined otherwise, all technical and scientific terms used herein have the same meaning as commonly understood by one of ordinary skill in the art to which embodiments of the disclosure pertain. Many methods and materials similar, modified, or equivalent to those described herein can be used in the practice of the embodiments of the present disclosure without undue experimentation, the preferred materials and methods are described herein. In describing and claiming the embodiments of the present disclosure, the following terminology will be used in accordance with the definitions set out below.

The term "about," as used herein, refers to variation in the numerical quantity that can occur, for example, through typical measuring and liquid handling procedures used for making concentrates or use solutions in the real world; through inadvertent error in these procedures; through differences in the manufacture, source, or purity of the ingredients used to make the compositions or carry out the methods; and the like. The term "about" also encompasses amounts that differ due to different equilibrium conditions for a composition resulting from a particular initial mixture. Whether or not modified by the term "about", the claims include equivalents to the quantities.

The term "actives" or "percent actives" or "percent by weight actives" or "actives concentration" are used interchangeably herein and refers to the concentration of those ingredients involved in cleaning expressed as a percentage minus inert ingredients such as water or salts.

As used herein, the term "alkyl" or "alkyl groups" refers to saturated hydrocarbons having one or more carbon atoms, including straight-chain alkyl groups (e.g., methyl, ethyl, propyl, butyl, pentyl, hexyl, heptyl, octyl, nonyl, decyl, etc.), cyclic alkyl groups (or "cycloalkyl" or "alicyclic" or "carbocyclic" groups) (e.g., cyclopropyl, cyclopentyl, cyclohexyl, cycloheptyl, cyclooctyl, etc.), branched-chain alkyl groups (e.g., isopropyl, tert-butyl, sec-butyl, isobutyl, etc.), and alkyl-substituted alkyl groups (e.g., alkyl-substituted cycloalkyl groups and cycloalkyl-substituted alkyl groups).

Unless otherwise specified, the term "alkyl" includes both "unsubstituted alkyls" and "substituted alkyls." As used herein, the term "substituted alkyls" refers to alkyl groups having substituents replacing one or more hydrogens on one or more carbons of the hydrocarbon backbone. Such substituents may include, for example, alkenyl, alkynyl, halogeno, hydroxyl, alkylcarbonyloxy, arylcarbonyloxy, alkoxycarbonyloxy, aryloxy, aryloxycarbonyloxy, carboxylate, alkylcarbonyl, arylcarbonyl, alkoxycarbonyl, aminocarbonyl, alkylaminocarbonyl, dialkylaminocarbonyl, alkylthiocarbonyl, alkoxyl, phosphate, phosphonato, phosphinato, cyano, amino (including alkyl amino, dialkylamino, arylamino, diarylamino, and alkylarylamino), acylamino (including alkylcarbonylamino, arylcarbonylamino, carbamoyl and ureido), imino, sulfhydryl, alkylthio, arylthio, thiocarboxylate, sulfates, alkylsulfinyl, sulfonates, sulfamoyl, sulfonamido, nitro, trifluoromethyl, cyano, azido, heterocyclic, alkylaryl, or aromatic (including heteroaromatic) groups.

In some embodiments, substituted alkyls can include a heterocyclic group. As used herein, the term "heterocyclic group" includes closed ring structures analogous to carbocyclic groups in which one or more of the carbon atoms in the ring is an element other than carbon, for example, nitrogen, sulfur or oxygen. Heterocyclic groups may be saturated or unsaturated. Exemplary heterocyclic groups include, but are not limited to, aziridine, ethylene oxide (epoxides, oxiranes), thiirane (episulfides), dioxirane, azetidine, oxetane, thietane, dioxetane, dithietane, dithiete, azolidine, pyrrolidine, pyrroline, oxolane, dihydrofuran, and furan.

As used herein, the term "cleaning" refers to a method used to facilitate or aid in soil removal, bleaching, microbial population reduction, rinsing, and any combination thereof.

As used herein, the phrase "food processing surface" refers to a surface of a tool, a machine, equipment, a structure, a building, or the like that is employed as part of a food processing, preparation, or storage activity. Examples of food processing surfaces include surfaces of food processing or preparation equipment (e.g., slicing, canning, or transport equipment, including flumes), of food processing wares (e.g., utensils, dishware, wash ware, and bar glasses), and of floors, walls, or fixtures of structures in which food processing occurs. Food processing surfaces are found and employed in food anti-spoilage air circulation systems, aseptic packaging sanitizing, food refrigeration and cooler cleaners and sanitizers, ware washing sanitizing, blancher cleaning and sanitizing, food packaging materials, cutting board additives, third-sink sanitizing, beverage chillers and warmers, meat chilling or scalding waters, autodish sanitizers, sanitizing gels, cooling towers, food processing antimicrobial garment sprays, and non-to-low-aqueous food preparation lubricants, oils, and rinse additives.

The term "hard surface" refers to a solid, substantially non-flexible surface such as a counter top, tile, floor, wall, panel, window, plumbing fixture, kitchen and bathroom furniture, appliance, engine, circuit board, and dish. Hard surfaces may include for example, health care surfaces and food processing surfaces.

The terms "include" and "including" when used in reference to a list of materials refer to but are not limited to the materials so listed.

As used herein, the term "phosphate-free" refers to a composition, mixture, or ingredient that does not contain a phosphate or phosphate-containing compound or to which a phosphate or phosphate-containing compound has not been added. Should a phosphate or phosphate-containing compound be present through contamination of a phosphate-free composition, mixture, or ingredients, the amount of phosphate shall be less than 0.5 wt %. More preferably, the amount of phosphate is less than 0.1 wt-%, and most preferably, the amount of phosphate is less than 0.01 wt %.

As used herein, the term "phosphorus-free" or "substantially phosphorus-free" refers to a composition, mixture, or ingredient that does not contain phosphorus or a phosphorus-containing compound or to which phosphorus or a phosphorus-containing compound has not been added. Should phosphorus or a phosphorus-containing compound be present through contamination of a phosphorus-free composition, mixture, or ingredients, the amount of phosphorus shall be less than 0.5 wt %. More preferably, the amount of phosphorus is less than 0.1 wt-%, and most preferably the amount of phosphorus is less than 0.01 wt %.

As used herein, the term "soil" refers to polar or non-polar organic or inorganic substances including, but not limited to carbohydrates, proteins, fats, oils and the like.

The term "solid" refers to a composition in a generally shape-stable form under expected storage conditions, for example a powder, particle, agglomerate, flake, granule, pellet, tablet, lozenge, puck, briquette, brick or block, and whether in a unit dose or a portion from which measured unit doses may be withdrawn. A solid may have varying degrees of shape stability, but typically will not flow perceptibly and will substantially retain its shape under moderate stress, pressure or mere gravity, as for example, when a molded solid is removed from a mold, when an extruded solid exits an extruder, and the like. A solid may have varying degrees of surface hardness, and for example may range from that of a fused solid block whose surface is relatively dense and hard, resembling concrete, to a consistency characterized as being malleable and sponge-like, resembling a cured caulking material.

As used herein, the term "substantially free" or "free" refers to compositions completely lacking the component or having such a small amount of the component that the component does not affect the performance of the composition. The component may be present than about 0.5 wt-%. In another embodiment, the amount of the component is less than about 0.1 wt-% and in yet another embodiment, the amount of component is less than about 0.01 wt-%.

The term "substantially similar cleaning performance" refers generally to achievement by a substitute cleaning product or substitute cleaning system of generally the same degree (or at least not a significantly lesser degree) of cleanliness or with generally the same expenditure (or at least not a significantly lesser expenditure) of effort, or both.

The term "weight percent," "wt-%," "percent by weight," "% by weight," and variations thereof, as used herein, refer to the concentration of a substance as the weight of that substance divided by the total weight of the composition and multiplied by 100. It is understood that, as used here, "percent," "%," and the like are intended to be synonymous with "weight percent," "wt-%," etc.

The term "use solution" is used here to refer to a composition having a concentration of active ingredients that is ready to be used as-is without further dilution.

The term "water soluble" is used to refer to compounds that are freely soluble or very soluble in water and have a solubility of 10 g per 100 mL or greater. "Substantially water soluble" is used to refer to compounds that have a solubility of about 3 to 10 g per 100 mL. "Somewhat water soluble" is used to refer to compounds that are sparingly soluble or slightly soluble in water and have a solubility of about 0.01 to 3 g per 100 mL. "Insoluble" is used to refer to compounds that are not soluble in water or that have a solubility of less than 0.01 g per 100 mL.

The methods and compositions of the present disclosure may comprise, consist essentially of, or consist of the components and ingredients of the present disclosure as well as other ingredients described herein. As used herein, "consisting essentially of" means that the methods and compositions may include additional steps, components or ingredients, but only if the additional steps, components or ingredients do not materially alter the basic and novel characteristics of the claimed methods and compositions.

Nonionic Surfactants

The surfactant combinations includes one or more specific nonionic surfactants. Nonionic surfactants improve soil removal and can reduce the contact angle of the solution on the surface being treated.

Nonionic surfactants are generally characterized by the presence of an organic hydrophobic group and an organic hydrophilic group and are typically produced by the condensation of an organic aliphatic, alkyl aromatic or polyoxyalkylene hydrophobic compound with a hydrophilic alkaline oxide moiety which in common practice is ethylene oxide or a polyhydration product thereof, polyethylene glycol. Practically any hydrophobic compound having a hydroxyl, carboxyl, amino, or amido group with a reactive hydrogen atom can be condensed with ethylene oxide, or its polyhydration adducts, or its mixtures with alkoxylenes such as propylene oxide to form a nonionic surface-active agent. The length of the hydrophilic polyoxyalkylene moiety which is condensed with any particular hydrophobic compound can be readily adjusted to yield a water dispersible or water soluble compound having the desired degree of balance between hydrophilic and hydrophobic properties.

Examples of suitable nonionic surfactants include: block polyoxypropylene-polyoxyethylene polymeric compounds, including commercially available products PLURONIC® and TETRONIC® manufactured by BASF Corp. in Florham Park, N.J.; condensation products of alkyl phenol with ethylene oxide, including commercially available products IGEPAL® manufactured by Solvay S. A. and TRITON® manufactured by Dow Chemical; condensation products of a straight or branched chain alcohol having from 6 to 24 carbon atoms with ethylene oxide, including commercially available products NEODOL® manufactured by Shell Chemical Co. and ALFONIC® manufactured by Sasol Limited.; condensation products of straight or branched chain carboxylic acid with ethylene oxide, including commercially available products NOPALCOL® manufactured by Henkel Corporation and LIPOPEG® manufactured by Lipo Chemicals, Inc.; and alkanoic acid esters formed by reaction with glycerides, glycerin, and polyhydric alcohols.

Alkoxylated (e.g., ethoxylated or propoxylated) C6-C18 fatty alcohols are suitable surfactants for use in the present compositions. An example of a suitable alkoxylated alcohol is ethoxylated C10 alcohol, commercially available as LUTENSOL XP® from BASF Corp., in Florham Park, N.J. Exemplary nonionic surfactants generally further include the following:

Block polyoxypropylene-polyoxyethylene polymeric compounds based upon propylene glycol, ethylene glycol, glycerol, trimethylolpropane, and ethylenediamine as the initiator reactive hydrogen compound, such as: difunctional block copolymers (PLURONIC® products available from BASF Corp.); and tetra-functional block copolymers (TETRONIC® products available from BASF Corp.).

Condensation products of one mole of alkyl phenol wherein the alkyl chain, of straight chain or branched chain configuration, or of single or dual alkyl constituent, contains from about 8 to about 18 carbon atoms with from about 3 to about 50 moles of ethylene oxide. The alkyl group can, for example, be represented by diisobutylene, di-amyl, polymerized propylene, iso-octyl, nonyl, and di-nonyl. These surfactants can be polyethylene, polypropylene, and polybutylene oxide condensates of alkyl phenols. Commercially available examples include IGEPAL® available from Solvay S. A., and TRITON® available from the DOW Chemical Company.

Condensation products of one mole of a saturated or unsaturated, straight or branched chain alcohol having from about 6 to about 24 carbon atoms with from about 3 to about 50 moles of ethylene oxide. The alcohol moiety can consist of mixtures of alcohols in the above delineated carbon range or it can consist of an alcohol having a specific number of carbon atoms within this range. Commercially available examples include NEODOL® available from Shell Chemical Co. and ALFONIC® available from Sasol North America, Inc.

Condensation products of one mole of saturated or unsaturated, straight or branched chain carboxylic acid having from about 8 to about 18 carbon atoms with from about 6 to about 50 moles of ethylene oxide. The acid can be a mixture of acids in the above-defined carbon atoms range or it can be an acid having a specific number of carbon atoms within the range. Commercially available examples include LIPOPEG® available from Lipo Chemicals, Inc.

Alkanoic acid esters formed by reaction with glycerides, glycerin, and polyhydric (saccharide or sorbitan/sorbitol) alcohols. All of these ester moieties have one or more reactive hydrogen sites on their molecule which can undergo further acylation or ethylene oxide (alkoxide) addition to control the hydrophilicity of these substances.

In some embodiments the composition comprises low-foaming nonionic surfactants. Exemplary low-foaming nonionic surfactants include:

Reverse block copolymers which are block copolymers, essentially reversed, by adding ethylene oxide to ethylene glycol to provide a hydrophile of designated molecular weight; and, then adding propylene oxide to obtain hydrophobic blocks on the outside (ends) of the molecule. The hydrophobic portion of the molecule weighs from about 1,000 to about 3,100 with the central hydrophile including 10% by weight to about 80% by weight of the final molecule. Also included are di-functional reverse block copolymers (commercially available as PLURONIC® R from BASF Corp.) and tetra-functional reverse block copolymers (commercially available as TETRONIC® R from BASF Corp.).

Capped nonionic surfactants which are modified by "capping" or "end blocking" the terminal hydroxy group or groups (of multifunctional moieties) to reduce foaming by reaction with a small hydrophobic molecule such as propylene oxide, butylene oxide, benzyl chloride; and, short chain fatty acids, alcohols or alkyl halides containing from 1 to about 5 carbon atoms; and mixtures thereof. Also included are reactants such as thionyl chloride which convert terminal hydroxy groups to a chloride group. Such modifications to the terminal hydroxy group may lead to all-block, block-heteric, heteric-block or all-heteric nonionics.

The alkylphenoxypolyethoxyalkanols of U.S. Pat. No. 2,903,486 issued Sep. 8, 1959 to Brown et al. and represented by the formula:

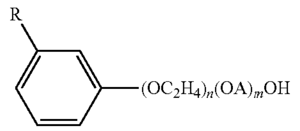

where R is an alkyl group of 8 to 9 carbon atoms; A is an alkylene chain of 3 to 4 carbon atoms; n is an integer of 7 to 16; and m is an integer of 1 to 10.

Polyalkylene glycol condensates described in U.S. Pat. No. 3,048,548 issued Aug. 7, 1962 to Martin et al., having alternating hydrophilic oxyethylene chains and hydrophobic oxypropylene chains where the weight of the terminal hydrophobic chains, the weight of the middle hydrophobic unit and the weight of the linking hydrophilic units each representing about one-third of the condensate.

Defoaming nonionic surfactants disclosed in U.S. Pat. No. 3,382,178 issued May 7 1968 to Lissant et al. having the general formula Z[(OR)nOH]z, where Z is an alkoxylatable material; R is a radical derived from an alkaline oxide which can be ethylene and propylene; n is an integer from 10 to 2,000 or more; and z is an integer determined by the number of reactive oxyalkylatable groups. Examples of commercially available defoaming or low foaming nonionic surfactants include LUTENSOL® and PLURAFAC®, both available from BASF Corp.

Conjugated polyoxyalkylene compounds described in U.S. Pat. No. 2,677,700, issued May 4, 1954 to Jackson et al. corresponding to the formula Y(C3H6O)n(C2H4O)mH where Y is the residue of organic compound having from about 1 to 6 carbon atoms and one reactive hydrogen atom; n is an average value of at least about 6.4, as determined by hydroxyl number; and m is a value such that the oxyethylene portion constitutes about 10% to about 90% by weight of the molecule.

The conjugated polyoxyalkylene compounds described in U.S. Pat. No. 2,674,619, issued Apr. 6, 1954 to Lundsted et al. having the formula Y[(C3H6On(C2H4O)mH]x where Y is the residue of an organic compound having from about 2 to 6 carbon atoms and containing x reactive hydrogen atoms where x has a value of at least about 2; n is a value such that the molecular weight of the polyoxypropylene hydrophobic base is at least about 900; and m is a value such that the oxyethylene content of the molecule is from about 10% to about 90% by weight. Compounds falling within the scope of the definition for Y include, for example, propylene glycol, glycerine, pentaerythritol, trimethylolpropane, ethylenediamine and the like. The oxypropylene chains optionally, but advantageously, contain small amounts of ethylene oxide and the oxyethylene chains also optionally, but advantageously, contain small amounts of propylene oxide.

Additional conjugated polyoxyalkylene surface-active agents correspond to the formula: P[(C3H6O)n(C2H4O)mH]x where P is the residue of an organic compound having from about 8 to 18 carbon atoms and containing x reactive hydrogen atoms where x has a value of 1 or 2; n is a value such that the molecular weight of the polyoxyethylene portion is at least about 44; and m is a value such that the oxypropylene content of the molecule is from about 10% to about 90% by weight. In either case the oxypropylene chains may optionally contain small amounts of ethylene oxide and the oxyethylene chains may also optionally contain small amounts of propylene oxide.

Other conjugated polyoxyalkylene surface-active agents sometimes described as extended surfactants correspond to the formula: P(C3H6O)n(C2H4O)mH where P is the residue of an organic compound having from about 8 to 18 carbon atoms and containing x reactive hydrogen atoms where x has a value of 1 or 2; n has a value of 1-20; and m has a value of 1-20. An example is the LUTENSOL XL series from BASF.

Polyhydroxy fatty acid amide surfactants include those having the structural formula R.sup.2CONR.sup.1Z where R.sup.1 is H, C1-C4 hydrocarbyl, 2-hydroxy ethyl, 2-hydroxy propyl, ethoxy, propoxy group, or a mixture thereof; R.sup.2 is a C5-C31 hydrocarbyl, which can be straight-chain; and Z is a polyhydroxyhydrocarbyl having a linear hydrocarbyl chain with at least 3 hydroxyls directly connected to the chain, or an alkoxylated derivative (preferably ethoxylated or propoxylated) thereof. Z can be derived from a reducing sugar in a reductive amination reaction; such as a glycityl moiety.

Alkyl ethoxylate condensation products of aliphatic alcohols with from about 0 to about 25 moles of ethylene oxide. The alkyl chain of the aliphatic alcohol can either be straight or branched, primary or secondary, and generally contains from 6 to 22 carbon atoms.

Ethoxylated C6-C18 fatty alcohols and C6-C18 mixed ethoxylated and propoxylated fatty alcohols. Suitable ethoxylated fatty alcohols include the C10-C18 ethoxylated fatty alcohols with a degree of ethoxylation of from 3 to 50.

Nonionic alkylpolysaccharide surfactants include those disclosed in U.S. Pat. No. 4,565,647, Llenado, issued Jan.

21, 1986. These surfactants include a hydrophobic group containing from about 6 to about 30 carbon atoms and a polysaccharide, e.g., a polyglycoside, hydrophilic group containing from about 1.3 to about 10 saccharide units. Any reducing saccharide containing 5 or 6 carbon atoms can be used, e.g., glucose, galactose and galactosyl moieties can be substituted for the glucosyl moieties. (Optionally the hydrophobic group is attached at the 2-, 3-, 4-, etc. positions thus giving a glucose or galactose as opposed to a glucoside or galactoside.) The intersaccharide bonds can be, e.g., between the one position of the additional saccharide units and the 2-, 3-, 4-, and/or 6-positions on the preceding saccharide units. Similar functionality can be achieved by glucamide surfactants, such as GLUCOPURE products available from Clariant.

Fatty acid amide surfactants include those having the formula $R^6CON(R^7)2$ where $R^6$ is an alkyl group containing from 7 to 21 carbon atoms; and each $R^7$ is independently hydrogen, C1-C4 alkyl, C1-C4 hydroxyalkyl, or —(C2H4O)xH, where x is from 1 to 3.

Another class of nonionic surfactants include the class defined as alkoxylated amines or, most particularly, alcohol alkoxylated/aminated/alkoxylated surfactants. These nonionic surfactants may be at least in part represented by the general formulae: $R^{20}$—(PO)sN-(EO)tH, $R^{20}$—(PO)sN-(EO)tH(EO)tH, and $R^{20}$—N(EO)tH; where $R^{20}$ is an alkyl, alkenyl or other aliphatic group, or an alkyl-aryl group of from 8 to 20, preferably 12 to 14 carbon atoms, EO is oxyethylene, PO is oxypropylene, s is 1-20, preferably 2-5, t is 1-10, preferably 2-5, and u is 1-10, preferably 2-5.

Other variations on the scope of these compounds may be represented by the alternative formula $R^{20}$—(PO)v-N[(EO)wH][(EO)zH], where $R^{20}$ is an alkyl, alkenyl or other aliphatic group, or an alkyl-aryl group of from 8 to 20, preferably 12 to 14 carbon atoms, v is 1 to 20 (e.g., 1, 2, 3, or 4 (preferably 2)), and w and z are independently 1-10, preferably 2-5.

These compounds are represented commercially by a line of products sold by Huntsman Chemicals as nonionic surfactants. One exemplary chemical of this class includes SURFONIC® PEA 25 Amine Alkoxylate.

Examples of semi-polar nonionic surfactants include:

Amine oxides are tertiary amine oxides corresponding to the general formula:

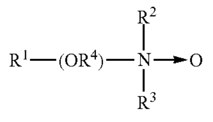

where the arrow is a conventional representation of a semi-polar bond; and, $R^1$, $R^2$, and $R^3$ may be aliphatic, aromatic, heterocyclic, alicyclic, or combinations thereof. Generally, for amine oxides of detergent interest, $R^1$ is an alkyl radical of from about 8 to about 24 carbon atoms; $R^2$ and $R^3$ are alkyl or hydroxyalkyl of 1-3 carbon atoms or a mixture thereof; $R^2$ and $R^3$ can be attached to each other, e.g. through an oxygen or nitrogen atom, to form a ring structure; $R^4$ is an alkaline or a hydroxyalkylene group containing 2 to 3 carbon atoms; and n ranges from 0 to about 20.

Useful water soluble amine oxide surfactants can be selected from coconut or tallow alkyl di-(lower alkyl) amine oxides, specific examples of which are dodecyldimethylamine oxide, tridecyldimethylamine oxide, tetradecyldimethylamine oxide, pentadecyldimethylamine oxide, hexadecyldimethylamine oxide, heptadecyldimethylamine oxide, octadecyldimethylamine oxide, dodecyldipropylamine oxide, tetradecyldipropylamine oxide, hexadecyldipropylamine oxide, tetradecyldibutylamine oxide, octadecyldibutylamine oxide, bis(2-hydroxyethyl) dodecylamine oxide, bis(2-hydroxyethyl)-3-dodecoxy-1-hydroxypropylamine oxide, dimethyl-(2-hydroxydodecyl)amine oxide, 3,6,9-trioctadecyldimethylamine oxide and 3-dodecoxy-2-hydroxypropyldi-(2-hydroxyethyl)amine oxide.

Semi-polar nonionic surfactants also include the water soluble phosphine oxides having the following structure:

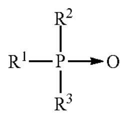

where the arrow is a conventional representation of a semi-polar bond; R.sup.1 is an alkyl, alkenyl or hydroxyalkyl moiety ranging from 10 to about 24 carbon atoms in chain length; and R.sup.2 and R.sup.3 are each alkyl moieties separately selected from alkyl or hydroxyalkyl groups containing 1 to 3 carbon atoms. Examples of useful phosphine oxides include dimethyldecylphosphine oxide, dimethyltetradecylphosphine oxide, methylethyltetradecylphosphone oxide, dimethylhexadecylphosphine oxide, diethyl-2-hydroxyoctyldecylphosphine oxide, bis(2-hydroxyethyl)dodecylphosphine oxide, and bis(hydroxymethyl)tetradecylphosphine oxide.

Semi-polar nonionic surfactants also include the water soluble sulfoxide compounds which have the structure:

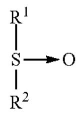

where the arrow is a conventional representation of a semi-polar bond; R.sup.1 is an alkyl or hydroxyalkyl moiety of about 8 to about 28 carbon atoms, from 0 to about 5 ether linkages and from 0 to about 2 hydroxyl substituents; and R.sup.2 is an alkyl moiety consisting of alkyl and hydroxyalkyl groups having 1 to 3 carbon atoms. Useful examples of these sulfoxides include dodecyl methyl sulfoxide; 3-hydroxy tridecyl methyl sulfoxide; 3-methoxy tridecyl methyl sulfoxide; and 3-hydroxy-4-dodecoxybutyl methyl sulfoxide.

Synergistic Nonionic Surfactants

Suitable nonionic surfactants suitable for use with the surfactant package disclosed include ethoxylated, propoxylated alcohol alkoxylate or ethoxylated propoxylated fatty alcohol surfactants. Suitable alkoxylated surfactants include EO/PO copolymers, capped EO/PO copolymers, alcohol alkoxylates, capped alcohol alkoxylates, mixtures thereof, or the like. Specific alkoxylated surfactants include EO/PO block copolymers, such as the Pluronic and reverse Pluronic surfactants such as 25R2; alcohol alkoxylates, such as Dehypon LS-36 ($R-(EO)_3(PO)_6$) and Dehypon LS-54 ($R-(EO)_5(PO)_4$); Plurafac SLF 180, and capped alcohol alkoxylates, such as Plurafac LF221 and Tegoten EC11; mixtures thereof, or the like.

Anionic Surfactants

The synergistic surfactant combination includes anionic surfactants, which are surface active substances with a charge on the hydrophobe is negative; or surfactants in which the hydrophobic section of the molecule carries no charge unless the pH is elevated to neutrality or above (e.g. carboxylic acids). In general carboxylate, sulfonate, sulfate and phosphate are the polar (hydrophilic) solubilizing groups found in anionic surfactants. Of the cations (counter ions) associated with these polar groups, sodium, lithium and potassium impart water solubility; ammonium and substituted ammonium ions provide both water and oil solubility; and, calcium, barium, and magnesium promote oil solubility. As those skilled in the art understand, anionics are excellent detersive surfactants and are therefore favored additions to heavy duty detergent compositions.

Anionic sulfate surfactants include alkyl ether sulfates, alkyl sulfates, the linear and branched primary and secondary alkyl sulfates, alkyl ethoxysulfates, fatty oleyl glycerol sulfates, alkyl phenol ethylene oxide ether sulfates, the $C_5$-$C_{17}$ acyl-N—($C_1$-$C_4$ alkyl) and —N—($C_1$-$C_2$ hydroxyalkyl) glucamine sulfates, and sulfates of alkylpolysaccharides such as the sulfates of alkylpolyglucoside, and the like. Also included are the alkyl sulfates, alkyl poly(ethyleneoxy) ether sulfates and aromatic poly(ethyleneoxy) sulfates such as the sulfates or condensation products of ethylene oxide and nonyl phenol (usually having 1 to 6 oxyethylene groups per molecule).

Anionic carboxylate surfactants include carboxylic acids (and salts), such as alkanoic acids (and alkanoates), ester carboxylic acids (e.g. alkyl succinates), ether carboxylic acids, sulfonated fatty acids, such as sulfonated oleic acid, and the like. Such carboxylates include alkyl ethoxy carboxylates, alkyl aryl ethoxy carboxylates, alkyl polyethoxy polycarboxylate surfactants and soaps (e.g. alkyl carboxyls). Secondary carboxylates useful in the present compositions include those which contain a carboxyl unit connected to a secondary carbon. The secondary carbon can be in a ring structure, e.g. as in p-octyl benzoic acid, or as in alkyl-substituted cyclohexyl carboxylates. The secondary carboxylate surfactants typically contain no ether linkages, no ester linkages and no hydroxyl groups. Further, they typically lack nitrogen atoms in the head-group (amphiphilic portion). Suitable secondary soap surfactants typically contain 11-13 total carbon atoms, although more carbons atoms (e.g., up to 16) can be present. Suitable carboxylates also include acylamino acids (and salts), such as acylgluamates, acyl peptides, sarcosinates (e.g. N-acyl sarcosinates), taurates (e.g. N-acyl taurates and fatty acid amides of methyl tauride), and the like.

Suitable anionic surfactants include alkyl or alkylaryl ethoxy carboxylates of the following formula:

$$R—O—(CH_2CH_2O)_n(CH_2)_m—CO_2X \quad (3)$$

in which R is a $C_8$ to $C_{22}$ alkyl group or

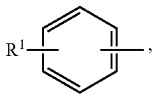

in which $R^1$ is a $C_4$-$C_{16}$ alkyl group; n is an integer of 1-20; m is an integer of 1-3; and X is a counter ion, such as hydrogen, sodium, potassium, lithium, ammonium, or an amine salt such as monoethanolamine, diethanolamine or triethanolamine. In some embodiments, n is an integer of 4 to 10 and m is 1. In some embodiments, R is a $C_8$-$C_{16}$ alkyl group. In some embodiments, R is a $C_{12}$-$C_{14}$ alkyl group, n is 4, and m is 1.

In other embodiments, R is

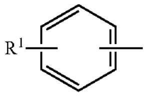

and $R^1$ is a $C_6$-$C_{12}$ alkyl group. In still yet other embodiments, $R^1$ is a $C_9$ alkyl group, n is 10 and m is 1.

Such alkyl and alkylaryl ethoxy carboxylates are commercially available. These ethoxy carboxylates are typically available as the acid forms, which can be readily converted to the anionic or salt form. Commercially available carboxylates include, Neodox 23-4, a $C_{12-13}$ alkyl polyethoxy (4) carboxylic acid (Shell Chemical), and Emcol CNP-110, a $C_9$ alkylaryl polyethoxy (10) carboxylic acid (Witco Chemical). Carboxylates are also available from Clariant, e.g. the product Sandopan® DTC, a $C_{13}$ alkyl polyethoxy (7) carboxylic acid.

Preferred anionic surfactants include sulfonate surfactants such as alkyl sulfonates, the linear primary and secondary alkyl sulfonates, and the aromatic sulfonates with or without substituents.

The combinations of the disclosure provide synergistic cleaning that is superior to either surfactant alone, provides cleaning of red and black soils that is at least as good as traditional anionic surfactant high foaming hard surface cleaners and also provides low foaming.

Additional Functional Ingredients

The components of the surfactant combination disclosed herein can further be combined with various functional components suitable for use in the hard surface cleaning applications, namely floor cleaning. Exemplary embodiments of the cleaning compositions comprising the surfactant package of the disclosure are shown in Table 1 in weight percentage of a hard surface cleaning compositions. The surfactant package, however can be used in any of a number of cleaning formulations which require low to medium foam and are used to clean surfaces with food and oily soils.

TABLE 1

Cleaning Composition Exemplary Embodiements

| Material | First Exemplary Range wt-% | Second Exemplary Range wt-% | Third Exemplary Range wt-% |
|---|---|---|---|
| Alkalinity Source | 5-50 | 10-45 | 15-40 |
| Glutamic acid | 10-60 | 15-55 | 20-50 |
| Surfactant package | 2-25 | 4-25 | 5-25 |
| Citric acid | 0.01-20 | 0.5-15 | 1-10 |
| Acrylic acid polymer | 0.01-20 | 0.5-15 | 1-10 |
| Chelating agent | 0-20 | 0-15 | 0-10 |
| Additional Functional Ingredients | 0-30 | 0-25 | 0-20 |

Embodiments include a composition that is substantially free of phosphates, phosphorous, or phosphonates, volatile organic compounds, and/or caustic alkalinity sources. In other embodiments, the cleaning compositions have a relatively high flash point (as defined by a composition or to a component of a composition having a flash point of greater than about 100 C), low vapor pressure (as defined by a solvent having a vapor pressure less than 0.1 mmHg when measured at 20 C) and a use pH of between about 7-9.

Alkalinity Sources

The cleaning compositions include at least one alkalinity source to provide desired alkaline cleaning conditions to remove the greasy soils from the surfaces in need of treatment. In an aspect, the alkalinity source(s) provides a use solution with a pH below about 11.5. In an aspect, the alkalinity source(s) provides a use solution with a pH less than about 11, less than about 10.5 or less than about 10. In a further aspect, the alkalinity source(s) provides a use solution with a pH between about 10-11.5.

Suitable alkalinity sources include, but are not limited to, one or more organic alkalinity sources, one or more inorganic alkalinity sources, or combinations thereof. Suitable organic alkalinity sources include, but are not limited to, amines and strong nitrogen bases including, for example monoethanolamine, monopropanolamine, diethanolamine, dipropanolamine, triethanolamine, tripropanolamine, mixed isopropanolamines, and the like, or combinations thereof. Suitable inorganic alkalinity sources include, but are not limited to, alkali metal hydroxides, alkali metal carbonates (e.g., sodium carbonate, potassium carbonate, sodium bicarbonate, potassium bicarbonate, sodium sesquicarbonate, potassium sesquicarbonate, and the like, or combinations thereof), alkali metal borates (e.g., sodium borate, potassium borate, and the like, or combinations thereof), alkali metal oxides (e.g., sodium oxide, potassium oxide, and the like, or combinations thereof), and the like, or combinations thereof. Examples of one or more alkalinity sources include one or more of an alkanolamine and/or alkali metal carbonate.

A number of commercially available alkalinity sources may be suitable for use in the cleaning compositions. Commercially available alkalinity sources may include amino alcohols include, but are not limited to, primary amino alcohols (e.g. 2-Amino-2-methyl-1-propanol), amino alcohols (e.g. 2-Amino-2-methyl-1-propanol), commercially available alkyl alkanolamines including, but not limited to, monoethanolamine and triethanolamine.

In a preferred aspect, the alkalinity sources can include ethanolamines and/or carbonates. In a further preferred aspect, the alkalinity sources include monoethanolamine, diethanolamine, triethanolamine, 2-amino-2-methyl-1-propanol, monoisopropanolamine, diisopropanolamine, 2-(2-Aminoethoxyl)ethanol (DGA) and/or an alkali metal carbonate. In a further preferred aspect, the alkalinity sources do not include caustic, including for example, any alkali metal hydroxides. In still other preferred aspects, the alkalinity sources do not include monoethanolamine, caustic and/or other highly alkaline components that result in an index value that require classification as a hazardous material, thereby requiring use of personal protective equipment (PPE) when handling the cleaning composition. In such preferred aspects, the alkalinity sources monoethanolamine, caustic and/or other highly alkaline components are included at less than about 1 wt-% per component in a concentrate cleaning composition. In other aspects, such alkalinity sources are excluded from the cleaning composition.

In an aspect, the compositions include from about 5 wt-% to about 50 wt-% alkalinity source, from about 10 wt-% to about 45 wt-% alkalinity source, from about 15 wt-% to about 40 wt-% alkalinity sources.

pH Modifier

The composition may comprise one or more pH modifiers. Examples of pH modifiers include acids, such as organic acids (e.g., carboxylic acids) or inorganic acids (e.g., hydrochloric acid, phosphoric acid, etc.) and bases, such as alkali metal hydroxides. The composition may comprise about 10 to about 60 wt-%, about 15 to about 55 wt-%, or about 20 wt-% to about 50 wt.

Chelating Agent

One primary purpose of traditional chelants is to sequester, complex, or chelate polyvalent cations. Examples of suitable chelants include phosphates, aminocarboxylates and their derivatives, pyrophosphates, polyphosphates (e.g., tripotassium polyphosphate “TKPP”), ethylenediamine and ethylenetriamine derivatives, hydroxyacids, and mono-, di-, and tri-carboxylates and their corresponding acids, polyacrylic acid and its salts, phosphonobutane carboxylic acid, and sodium gluconate. Other chelants include aluminosilicates, nitroloacetates and their derivatives, and mixtures thereof. Still other builders include aminocarboxylates, including salts of ethylenediaminetetraacetic acid (EDTA), hydroxyethylenediaminetetraacetic acid (HEDTA), diethylenetriaininepentaacetic acid, glutamic acid diacetic acid (GLDA), such as DISSOLVINE® GL available from AkzoNobel N. V., and methylglycinediacetic acid (MGDA), such as TRILON® M available from BASF Corp. The composition may comprise about 0 to about 20 wt-%, about 0 to about 15 wt-%, or about 0 wt-% to about 10 wt.

Stabilizing Agent

The compositions may include one or more stabilizing agent. Traditional agents include phosphates, polyphosphates, chelating agents, and may include silicates, carbonates and even inorganic sulfates. Traditional stabilizing agents are anionic, such as phosphates, polyphosphates, aminocarboxylates, silicates, and the like. Examples of suitable stabilizing agents include phosphonic acids and phosphonates, phosphates, aminocarboxylates and their derivatives, pyrophosphates, polyphosphates (e.g., tripotassium polyphosphate “TKPP”), ethylenediamine and ethylenetriamine derivatives, hydroxyacids, and mono-, di-, and tri-carboxylates and their corresponding acids, polyacrylic acid and its salts, phosphonobutane carboxylic acid, and sodium gluconate. Other builders include aluminosilicates, nitroloacetates and their derivatives, and mixtures thereof. Still other builders include aminocarboxylates, including salts of ethylenediaminetetraacetic acid (EDTA), hydroxyethylenediaminetetraacetic acid (HEDTA), diethylenetriaininepentaacetic acid, glutamic acid diacetic acid (GLDA), such as DISSOLVINE® GL available from AkzoNobel N. V., and methylglycinediacetic acid (MGDA), such as TRILON®. M available from BASF Corp.

Hardening/Solidification Agents/Solubility Modifiers

In some embodiments, the compositions of the present disclosure can include a hardening agent (or a solidification agent), as for example, an amide such stearic monoethanolamide or lauric diethanolamide, or an alkylamide, and the like; a solid polyethylene glycol, urea, and the like; starches that have been made water-soluble through an acid or alkaline treatment process; various inorganics that impart solidifying properties to a heated composition upon cooling, and the like. Such compounds may also vary the solubility of the composition in an aqueous medium during use such that the wetting agent and/or other active ingredients may be dispensed from the solid composition over an extended period of time.

A hardening agent or solidification agent can include one or more of sodium xylene sulfonate, sodium toluene sulfonate, sodium cumene sulfonate, potassium toluene sulfonate, ammonium xylene sulfonate, calcium xylene sulfonate, sodium alkyl naphthalene sulfonate, and sodium butylnaphthalene sulfonate. In an aspect of the disclosure, the class of short chain alkyl benzene or alkyl naphthalene hydrotropes includes alkyl benzene sulfonates based on toluene, xylene, and cumene, and alkyl naphthalene sulfonates. Sodium toluene sulfonate and sodium xylene sulfonate are the best known hydrotropes. In a preferred embodiment the solidification agent is SXS.

The compositions may optionally include a solidification aid in an amount in the range of up to about 80 wt-%, from about 35 wt-% to about 90 wt-%, about 45 wt-% to about 85 wt-%, or about 50 to about 80 wt-%.

Additional Functional Components

Solvents

The cleaning compositions include at least one solvent for penetration and breakdown of polymerized fats on surfaces. Exemplary solvents and solvent systems include limited water soluble alcohols. In an aspect, a benzyl alcohol solvent and/or solvent system is employed. Without being limited to a particular mechanism of action, in some embodiments, the solvent provides a limited water soluble alcohol providing hydrophobicity that adds affinity towards greasy soils and acts as a plasticizer.

Additional suitable solvents and solvent systems may include one or more different solvents including aromatic alcohols, alkanol amines, ether amines, amidines, esters and mixtures thereof. Representative solvents may include 1,8-Diazabicyclo[5.4.0]undec-7-ene, or also may be referred to as 2,3,4,6,7,8,9,10-Octahydropyrimidol[1,2-a]azepine (or DBU), 2.5.7.10-tetraoxaundecante (TOU), acetamidophenol, acetanilide, acetophenone, 2-acetyl-1-methylpyrrole, glycerine, benzyl acetate, benzyl alcohol, methyl benzyl alcohol, alpha phenyl ethanol, benzyl benzoate, benzyloxyethanol, ethylene glycol phenyl ether, propylene glycol phenyl ether, amyl acetate, amyl alcohol, butanol, 3-butoxyethyl-2-propanol, butyl acetate, n-butyl propionate, cyclohexanone, diacetone alcohol, diethoxyethanol, diethylene glycol methyl ether, diisobutyl carbinol, diisobutyl ketone, dimethyl heptanol, dipropylene glycol tert-butyl ether, ethanol, ethyl acetate, 2-ethylhexanol, ethyl propionate, ethylene glycol methyl ether acetate, hexanol, isobutanol, isobutyl acetate, isobutyl heptyl ketone, isophorone, isopropanol, isopropyl acetate, methanol, methyl amyl alcohol, methyl n-amyl ketone, 2-methyl-1-butanol, methyl ethyl ketone, methyl isobutyl ketone, 1-pentanol, n-pentyl propionate, 1-propanol, n-propyl acetate, n-propyl propionate, propylene glycol ethyl ether, tripropylene glycol methyl ether, tripropylene glycol n-butyl ether, diethylene glycol n-butyl ether acetate, diethylene glycol monobutyl ether, ethylene glycol n-butyl ether acetate, ethylene glycol monobutyl ether, dipropylene glycol monobutyl ether, propylene glycol monobutyl ether, ethyl 3-ethoxypropionate, 2,2,4-Trimethyl-1,3-Pentanediol Monoisobutyrate, diethylene glycol monohexyl ether, ethylene glycol monohexyl ether, diethylene glycol monomethyl ether, diethylene glycol monoethyl ether, ethylene glycol methyl ether acetate, ethylene glycol monomethyl ether, dipropylene glycol monomethyl ether, propylene glycol methyl ether acetate, propylene glycol monomethyl ether, diethylene glycol monopropyl ether, ethylene glycol monopropyl ether, dipropylene glycol monopropyl ether and propylene glycol monopropyl ether. Representative dialkyl carbonates include dimethyl carbonate, diethyl carbonate, dipropyl carbonate, diisopropyl carbonate and dibutyl carbonate. Representative oils include benzaldehyde, pinenes (alphas, betas, etc.), terpineols, terpinenes, carvone, cinnamealdehyde, borneol and its esters, citrals, ionenes, jasmine oil, limonene, dipentene, linalool and its esters. Representative dibasic esters include dimethyl adipate, dimethyl succinate, dimethyl glutarate, dimethyl malonate, diethyl adipate, diethyl succinate, diethyl glutarate, dibutyl succinate, dibutyl glutarate and products available under the trade designations DBE, DBE-3, DBE-4, DBE-5, DBE-6, DBE-9, DBE-IB, and DBE-ME from DuPont Nylon. Representative phthalate esters include dibutyl phthalate, diethylhexyl phthalate and diethyl phthalate.

Preferred solvents for wetting of polymerized soils include benzyl alcohol, dibasic esters, essential oils, dialkyl carbonates, ethylene glycol monobutyl ether, diethylene glycol monobutyl ether, ethylene glycol phenyl ether, propylene glycol phenyl ether and mixtures thereof.

In an aspect, the compositions include from about 1 wt-% to about 50 wt-% solvent, from about 3 wt-% to about 40 wt-% solvent, from about 5 wt-% to about 40 wt-% solvent, or from about 5 wt-% to about 30 wt-% solvent. In addition, without being limited according to the disclosure, all ranges recited are inclusive of the numbers defining the range and include each integer within the defined range.

Anti-Microbial/Sanitizing Agents

In some embodiments, the compositions of the present disclosure can include an antimicrobial agent. The antimicrobial agent can be provided in a variety of ways. For example, in some embodiments, the antimicrobial agent is included as part of the wetting agent composition. In other embodiments, the antimicrobial agent can be included as a separate component of a composition including the wetting agent composition.

Antimicrobial agents are chemical compositions that can be used in a functional material to prevent microbial contamination and deterioration of material systems, surfaces, etc. Generally, these materials fall in specific classes including phenolics, halogen compounds, quaternary ammonium compounds, metal derivatives, amines, alkanol amines, nitro derivatives, analides, organosulfur and sulfur-nitrogen compounds and miscellaneous compounds.

In some embodiments, antimicrobial agents suitable for use with the surfactant systems of the present disclosure include percarboxylic acid compositions or peroxygen compounds, and/or mixtures of diesters. For example, in some embodiments the antimicrobial agent included is at least one of peracetic acid, peroctanoic acid, and mixtures and derivatives thereof. In other embodiments, the sanitizing and/or antimicrobial agent may be a two solvent antimicrobial composition such as the composition disclosed in U.S. Pat. No. 6,927,237, the entire contents of which are hereby incorporated by reference.

In other embodiments, the sanitizing and/or antimicrobial agent may include compositions of mono- or diester dicarboxylates. Suitable mono- or diester dicarboxylates include mono- or dimethyl, mono- or diethyl, mono- or dipropyl (n- or iso), or mono- or dibutyl esters (n-, sec, or tert), or amyl esters (n-, sec-, iso-, or tert-) of malonic, succinic, glutaric, adipic, or sebacic acids, or mixtures thereof. Mixed esters (e.g., monomethyl/monoethyl, or monopropyl/monoethyl) can also be employed. Preferred mono- or diester dicarboxylates are commercially available and soluble in water or another carrier at concentrations effective for antimicrobial activity. Preferred mono- or diester dicarboxylates are toxic to microbes but do not exhibit unacceptable toxicity to humans under formulation or use conditions. Exemplary compositions including mono- or diester dicarboxylates are disclosed in U.S. Pat. No. 7,060,301, the entire contents of which are hereby incorporated by reference.

Some examples of common sanitizing and/or antimicrobial agents include phenolic antimicrobials such as pentachlorophenol, orthophenylphenol, a chloro-p-benzylphenol, p-chloro-m-xylenol. Halogen containing antibacterial agents include sodium trichloroisocyanurate, sodium dichloro isocyanate (anhydrous or dihydrate), iodine-poly (vinylpyrolidinone) complexes, bromine compounds such as 2-bromo-2-nitropropane-1,3-diol, and quaternary antimicrobial agents such as benzalkonium chloride, didecyldimethyl ammonium chloride, choline diiodochloride, tetramethyl phosphonium tribromide. Other antimicrobial compositions such as hexahydro-1,3,5-tris(2-hydroxyethyl)-s-triazine, dithiocarbamates such as sodium dimethyldithiocarbamate, and a variety of other materials are known in the art for their antimicrobial properties.

Additional examples of common sanitizing and/or antimicrobial agents include chlorine-containing compounds such as a chlorine, a hypochlorite, chloramines, of the like. In some embodiments, an antimicrobial component, can be included in the range of up to about 75% by wt. of the composition, up to about 20 wt. %, in the range of about 1.0 wt % to about 20 wt %, in the range of about 5 wt % to about 10 wt %, in the range of about 0.01 to about 1.0 wt. %, or in the range of 0.05 to 0.05 wt % of the composition. Water or Other Carrier The cleaning compositions when provided as liquid formulations, including concentrations and/or ready-to-use solutions, of use solutions created from solid formulations include water and/or a carrier. In an aspect, the compositions include from about 15 wt-% to about 90 wt-% water and/or other carrier, from about 15 wt-% to about 80 wt-% water and/or other carrier, from about 5 wt-% to about 40 wt-% solvent, or from about 5 wt-% to about 30 wt-% solvent. In addition, without being limited according to the disclosure, all ranges recited are inclusive of the numbers defining the range and include each integer within the defined range.

Additional Surfactants

Oher Nonionic Surfactants

Additional nonionic surfactants may also be present such as the following.

Condensation products of one mole of alkyl phenol wherein the alkyl chain, of straight chain or branched chain configuration, or of single or dual alkyl constituent, contains from about 8 to about 18 carbon atoms with from about 3 to about 50 moles of ethylene oxide. The alkyl group can, for example, be represented by diisobutylene, di-amyl, polymerized propylene, iso-octyl, nonyl, and di-nonyl. These surfactants can be polyethylene, polypropylene, and polybutylene oxide condensates of alkyl phenols. Examples of commercial compounds of this chemistry are available on the market under the trade names Igepal® manufactured by Rhone-Poulene and Triton® manufactured by Union Carbide.

Condensation products of one mole of saturated or unsaturated, straight or branched chain carboxylic acid having from about 8 to about 18 carbon atoms with from about 6 to about 50 moles of ethylene oxide. The acid moiety can consist of mixtures of acids in the above defined carbon atoms range or it can consist of an acid having a specific number of carbon atoms within the range. Examples of commercial compounds of this chemistry are available on the market under the trade names Disponil or Agnique manufactured by BASF and Lipopeg™ manufactured by Lipo Chemicals, Inc.

In addition to ethoxylated carboxylic acids, commonly called polyethylene glycol esters, other alkanoic acid esters formed by reaction with glycerides, glycerin, and polyhydric (saccharide or sorbitan/sorbitol) alcohols have application in this disclosure for specialized embodiments, particularly indirect food additive applications. All of these ester moieties have one or more reactive hydrogen sites on their molecule which can undergo further acylation or ethylene oxide (alkoxide) addition to control the hydrophilicity of these substances. Care must be exercised when adding these fatty ester or acylated carbohydrates to compositions of the present disclosure containing amylase and/or lipase enzymes because of potential incompatibility.

Polyhydroxy fatty acid amide surfactants suitable for use in the present compositions include those having the structural formula $R_2CON_{R1}Z$ in which: R1 is H, $C_1$-$C_4$ hydrocarbyl, 2-hydroxy ethyl, 2-hydroxy propyl, ethoxy, propoxy group, or a mixture thereof; $R^2$ is a $C_5$-$C_{31}$ hydrocarbyl, which can be straight-chain; and Z is a polyhydroxyhydrocarbyl having a linear hydrocarbyl chain with at least 3 hydroxyls directly connected to the chain, or an alkoxylated derivative (preferably ethoxylated or propoxylated) thereof. Z can be derived from a reducing sugar in a reductive amination reaction; such as a glycityl moiety.

The alkyl ethoxylate condensation products of aliphatic alcohols with from about 0 to about 25 moles of ethylene oxide are suitable for use in the present compositions. The alkyl chain of the aliphatic alcohol can either be straight or branched, primary or secondary, and generally contains from 6 to 22 carbon atoms.

The ethoxylated $C_6$-$C_{18}$ fatty alcohols and $C_6$-$C_{18}$ mixed ethoxylated and propoxylated fatty alcohols are suitable surfactants for use in the present compositions, particularly those that are water soluble. Suitable ethoxylated fatty alcohols include the $C_6$-$C_{18}$ ethoxylated fatty alcohols with a degree of ethoxylation of from 3 to 50.

Suitable nonionic alkylpolysaccharide surfactants, particularly for use in the present compositions include those disclosed in U.S. Pat. No. 4,565,647, Llenado, issued Jan. 21, 1986. These surfactants include a hydrophobic group containing from about 6 to about 30 carbon atoms and a polysaccharide, e.g., a polyglycoside, hydrophilic group containing from about 1.3 to about 10 saccharide units. Any reducing saccharide containing 5 or 6 carbon atoms can be used, e.g., glucose, galactose and galactosyl moieties can be substituted for the glucosyl moieties. (Optionally the hydrophobic group is attached at the 2-, 3-, 4-, etc. positions thus giving a glucose or galactose as opposed to a glucoside or galactoside.) The intersaccharide bonds can be, e.g., between the one position of the additional saccharide units and the 2-, 3-, 4-, and/or 6-positions on the preceding saccharide units.

Fatty acid amide surfactants suitable for use the present compositions include those having the formula: $R_6CON(R_7)_2$ in which $R_6$ is an alkyl group containing from 7 to 21 carbon atoms and each $R_7$ is independently hydrogen, $C_1$-$C_4$ alkyl, $C_1$-$C_4$ hydroxyalkyl, or —$(C_2H_4O)xH$, where x is in the range of from 1 to 3.

A useful class of non-ionic surfactants include the class defined as alkoxylated amines or, most particularly, alcohol alkoxylated/aminated/alkoxylated surfactants. These non-ionic surfactants may be at least in part represented by the general formulae: $R^{20}$—$(PO)_SN$-$(EO)_tH$, $R^{20}$—$(PO)_SN$-$(EO)_tH(EO)_tH$, and $R^{20}$—$N(EO)_tH$; in which $R^{20}$ is an alkyl, alkenyl or other aliphatic group, or an alkyl-aryl group of from 8 to 20, preferably 12 to 14 carbon atoms, EO is oxyethylene, PO is oxypropylene, s is 1 to 20, preferably 2-5, t is 1-10, preferably 2-5, and u is 1-10, preferably 2-5. Other variations on the scope of these compounds may be represented by the alternative formula: $R^{20}$—(PO)v-N[(EO)$_w$H][(EO) zH] in which $R^{20}$ is as defined above, v is 1 to 20 (e.g., 1, 2, 3, or 4 (preferably 2)), and w and z are independently 1-10, preferably 2-5. These compounds are represented commercially by a line of products sold by Huntsman Chemicals as nonionic surfactants. A preferred chemical of this class includes Surfonic™ PEA 25 Amine Alkoxylate. Preferred nonionic surfactants for the compositions of the disclosure include alcohol alkoxylates, EO/PO block copolymers, alkylphenol alkoxylates, and the like.

The treatise Nonionic Surfactants, edited by Schick, M. J., Vol. 1 of the Surfactant Science Series, Marcel Dekker, Inc., New York, 1983 is an excellent reference on the wide variety of nonionic compounds generally employed in the practice of the present disclosure. A typical listing of nonionic classes, and species of these surfactants, is given in U.S. Pat. No. 3,929,678 issued to Laughlin and Heuring on Dec. 30, 1975. Further examples are given in “Surface Active Agents and detergents” (Vol. I and II by Schwartz, Perry and Berch).

Cationic Surfactants

Cationic surfactants may also be present. Surface active substances are classified as cationic if the charge on the hydrotrope portion of the molecule is positive. Surfactants in which the hydrotrope carries no charge unless the pH is lowered close to neutrality or lower, but which are then cationic (e.g. alkyl amines), are also included in this group. In theory, cationic surfactants may be synthesized from any combination of elements containing an “onium” structure RnX+Y— and could include compounds other than nitrogen (ammonium) such as phosphorus (phosphonium) and sulfur (sulfonium). In practice, the cationic surfactant field is dominated by nitrogen containing compounds, probably because synthetic routes to nitrogenous cationics are simple and straightforward and give high yields of product, which can make them less expensive.

Cationic surfactants preferably include, more preferably refer to, compounds containing at least one long carbon chain hydrophobic group and at least one positively charged nitrogen. The long carbon chain group may be attached directly to the nitrogen atom by simple substitution; or more preferably indirectly by a bridging functional group or groups in so-called interrupted alkylamines and amido amines. Such functional groups can make the molecule more hydrophilic and/or more water dispersible, more easily water solubilized by co-surfactant mixtures, and/or water soluble. For increased water solubility, additional primary, secondary or tertiary amino groups can be introduced or the amino nitrogen can be quaternized with low molecular weight alkyl groups. Further, the nitrogen can be a part of branched or straight chain moiety of varying degrees of unsaturation or of a saturated or unsaturated heterocyclic ring. In addition, cationic surfactants may contain complex linkages having more than one cationic nitrogen atom.

The surfactant compounds classified as amine oxides, amphoterics and zwitterions are themselves typically cationic in near neutral to acidic pH solutions and can overlap surfactant classifications. Polyoxyethylated cationic surfactants generally behave like nonionic surfactants in alkaline solution and like cationic surfactants in acidic solution.

The simplest cationic amines, amine salts and quaternary ammonium compounds can be schematically drawn thus:

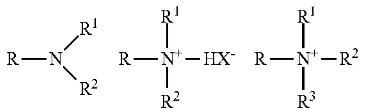

in which, R represents an alkyl chain, R', R", and R'" may be either alkyl chains or aryl groups or hydrogen and X represents an anion. The amine salts and quaternary ammonium compounds are preferred for practical use in this disclosure due to their high degree of water solubility.

The majority of large volume commercial cationic surfactants can be subdivided into four major classes and additional sub-groups known to those or skill in the art and described in “Surfactant Encyclopedia”, Cosmetics & Toiletries, Vol. 104 (2) 86-96 (1989). The first class includes alkylamines and their salts. The second class includes alkyl imidazolines. The third class includes ethoxylated amines. The fourth class includes quaternaries, such as alkylbenzyldimethylammonium salts, alkyl benzene salts, heterocyclic ammonium salts, tetra alkylammonium salts, and the like. Cationic surfactants are known to have a variety of properties that can be beneficial in the present compositions. These desirable properties can include detergency in compositions of or below neutral pH, antimicrobial efficacy, thickening or gelling in cooperation with other agents, and the like.

Cationic surfactants useful in the compositions of the present disclosure include those having the formula $R^1{}_mR^2{}_xY_LZ$ wherein each $R^1$ is an organic group containing a straight or branched alkyl or alkenyl group optionally substituted with up to three phenyl or hydroxy groups and optionally interrupted by up to four of the following structures:

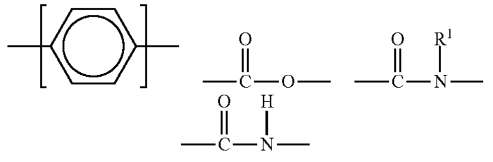

or an isomer or mixture of these structures, and which contains from about 8 to 22 carbon atoms. The $R^1$ groups can additionally contain up to 12 ethoxy groups. m is a number from 1 to 3. Preferably, no more than one $R^1$ group in a molecule has 16 or more carbon atoms when m is 2 or more than 12 carbon atoms when m is 3. Each $R^2$ is an alkyl or hydroxyalkyl group containing from 1 to 4 carbon atoms or a benzyl group with no more than one $R^2$ in a molecule being benzyl, and x is a number from 0 to 11, preferably from 0 to 6. The remainder of any carbon atom positions on the Y group are filled by hydrogens. Y is can be a group including, but not limited to:

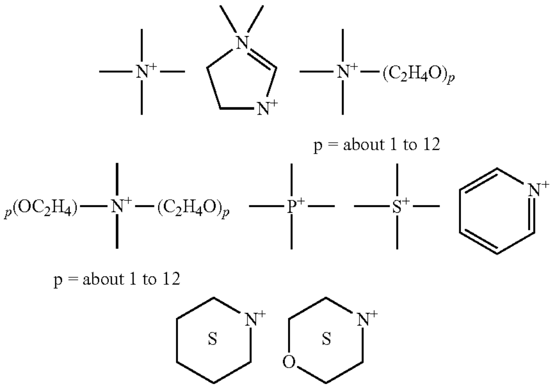

p = about 1 to 12 p = about 1 to 12 or a mixture thereof. Preferably, L is 1 or 2, with the Y groups being separated by a moiety selected from $R^1$ and $R^2$ analogs (preferably alkylene or alkenylene) having from 1 to about 22 carbon atoms and two free carbon single bonds when L is 2. Z is a water soluble anion, such as a halide, sulfate, methylsulfate, hydroxide, or nitrate anion, particularly preferred being chloride, bromide, iodide, sulfate or methyl sulfate anions, in a number to give electrical neutrality of the cationic component.

Amphoteric Surfactants

Amphoteric, or ampholytic, surfactants may also be present and contain both a basic and an acidic hydrophilic group and an organic hydrophobic group. These ionic entities may be any of anionic or cationic groups described herein for other types of surfactants. A basic nitrogen and an acidic carboxylate group are the typical functional groups employed as the basic and acidic hydrophilic groups. In a few surfactants, sulfonate, sulfate, phosphonate or phosphate provide the negative charge.

Amphoteric surfactants can be broadly described as derivatives of aliphatic secondary and tertiary amines, in which the aliphatic radical may be straight chain or branched and wherein one of the aliphatic substituents contains from about 8 to 18 carbon atoms and one contains an anionic water solubilizing group, e.g., carboxy, sulfo, sulfato, phosphato, or phosphono. Amphoteric surfactants are subdivided into two major classes known to those of skill in the art and described in "Surfactant Encyclopedia" Cosmetics & Toiletries, Vol. 104 (2) 69-71 (1989), which is herein incorporated by reference in its entirety. The first class includes acyl/dialkyl ethylenediamine derivatives (e.g. 2-alkyl hydroxyethyl imidazoline derivatives) and their salts. The second class includes N-alkylamino acids and their salts. Some amphoteric surfactants can be envisioned as fitting into both classes.

Amphoteric surfactants can be synthesized by methods known to those of skill in the art. For example, 2-alkyl hydroxyethyl imidazoline is synthesized by condensation and ring closure of a long chain carboxylic acid (or a derivative) with dialkyl ethylenediamine. Commercial amphoteric surfactants are derivatized by subsequent hydrolysis and ring-opening of the imidazoline ring by alkylation—for example with chloroacetic acid or ethyl acetate. During alkylation, one or two carboxy-alkyl groups react to form a tertiary amine and an ether linkage with differing alkylating agents yielding different tertiary amines.

Long chain imidazole derivatives having application in the present disclosure generally have the general formula:

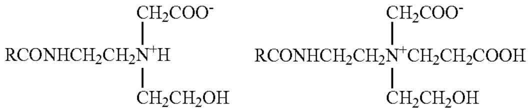

(MONO)ACETATE (DI)PROPIONATE

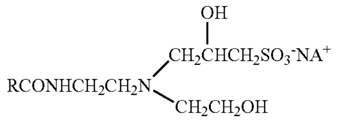

Neutral pH Zwitternion
AMPHOTERIC SULFONATE wherein R is an acyclic hydrophobic group containing from about 8 to 18 carbon atoms and M is a cation to neutralize the charge of the anion, generally sodium. Commercially prominent imidazoline-derived amphoterics that can be employed in the present compositions include for example: Cocoamphopropionate, Cocoamphocarboxy-propionate, Cocoamphoglycinate, Cocoamphocarboxy-glycinate, Cocoamphopropyl-sulfonate, and Cocoamphocarboxy-propionic acid. Amphocarboxylic acids can be produced from fatty imidazolines in which the dicarboxylic acid functionality of the amphodicarboxylic acid is diacetic acid and/or dipropionic acid.

The carboxymethylated compounds (glycinates) described herein above frequently are called betaines. Betaines are a special class of amphoteric discussed herein below in the section entitled, Zwitterion Surfactants.

Long chain N-alkylamino acids are readily prepared by reaction $RNH_2$, in which $R{=}C_8$-$C_{18}$ straight or branched chain alkyl, fatty amines with halogenated carboxylic acids. Alkylation of the primary amino groups of an amino acid leads to secondary and tertiary amines. Alkyl substituents may have additional amino groups that provide more than one reactive nitrogen center. Most commercial N-alkylamine acids are alkyl derivatives of beta-alanine or beta-N(2-carboxyethyl) alanine. Examples of commercial N-alkylamino acid ampholytes having application in this disclosure include alkyl beta-amino dipropionates, $RN(C_2H_4COOM)_2$ and $RNHC_2H_4COOM$. In an embodiment, R can be an acyclic hydrophobic group containing from about 8 to about 18 carbon atoms, and M is a cation to neutralize the charge of the anion.

Suitable amphoteric surfactants include those derived from coconut products such as coconut oil or coconut fatty acid. Additional suitable coconut derived surfactants include as part of their structure an ethylenediamine moiety, an alkanolamide moiety, an amino acid moiety, e.g., glycine, or a combination thereof; and an aliphatic substituent of from about 8 to 18 (e.g., 12) carbon atoms. Such a surfactant can also be considered an alkyl amphodicarboxylic acid. These amphoteric surfactants can include chemical structures represented as: $C_{12}$-alkyl-C(O)—NH—$CH_2$—$CH_2$—N*$(CH_2—CH_2—CO_2Na)_2$—$CH_2$—$CH_2$—OH or $C_{12}$-alkyl-C(O)—N(H)—$CH_2$—$CH_2$—$N^+(CH_2—CO_2Na)_2$—$CH_2$—$CH_2$—OH. Disodium cocoampho dipropionate is one suitable amphoteric surfactant and is commercially available under the tradename Miranol™ FBS from Rhodia Inc., Cranbury, N.J. Another suitable coconut derived amphoteric surfactant with the chemical name disodium cocoampho diacetate is sold under the tradename Mirataine™ JCHA, also from Rhodia Inc., Cranbury, N.J.

A typical listing of amphoteric classes, and species of these surfactants, is given in U.S. Pat. No. 3,929,678 issued to Laughlin and Heuring on Dec. 30, 1975. Further examples are given in "Surface Active Agents and Detergents" (Vol. I and II by Schwartz, Perry and Berch). Each of these references are herein incorporated by reference in their entirety.

Zwitterionic Surfactants

Zwitterionic surfactants can be thought of as a subset of the amphoteric surfactants and can include an anionic charge. Zwitterionic surfactants can be broadly described as derivatives of secondary and tertiary amines, derivatives of heterocyclic secondary and tertiary amines, or derivatives of quaternary ammonium, quaternary phosphonium or tertiary sulfonium compounds. Typically, a zwitterionic surfactant includes a positive charged quaternary ammonium or, in some cases, a sulfonium or phosphonium ion; a negative charged carboxyl group; and an alkyl group. Zwitterionics generally contain cationic and anionic groups which ionize to a nearly equal degree in the isoelectric region of the molecule and which can develop strong "inner-salt" attraction between positive-negative charge centers. Examples of such zwitterionic synthetic surfactants include derivatives of aliphatic quaternary ammonium, phosphonium, and sulfonium compounds, in which the aliphatic radicals can be straight chain or branched, and wherein one of the aliphatic substituents contains from 8 to 18 carbon atoms and one contains an anionic water solubilizing group, e.g., carboxy, sulfonate, sulfate, phosphate, or phosphonate.

Betaine and sultaine surfactants are exemplary zwitterionic surfactants for use herein. A general formula for these compounds is:

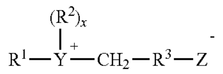

wherein $R^1$ contains an alkyl, alkenyl, or hydroxyalkyl radical of from 8 to 18 carbon atoms having from 0 to 10 ethylene oxide moieties and from 0 to 1 glyceryl moiety; Y is selected from the group consisting of nitrogen, phosphorus, and sulfur atoms; $R^2$ is an alkyl or monohydroxy alkyl group containing 1 to 3 carbon atoms; x is 1 when Y is a sulfur atom and 2 when Y is a nitrogen or phosphorus atom, $R^3$ is an alkylene or hydroxy alkylene or hydroxy alkylene of from 1 to 4 carbon atoms and Z is a radical selected from the group consisting of carboxylate, sulfonate, sulfate, phosphonate, and phosphate groups.

Examples of zwitterionic surfactants having the structures listed above include: 4-[N,N-di(2-hydroxyethyl)-N-octadecylammonio]-butane-1-carboxylate; 5-[S-3-hydroxypropyl-S-hexadecylsulfonio]-3-hydroxypentane-1-sulfate; 3-[P,P-diethyl-P-3,6,9-trioxatetracosanephosphonio]-2-hydroxypropane-1-phosphate; 3-[N,N-dipropyl-N-3-dodecoxy-2-hydroxypropyl-ammonio]-propane-1-phosphonate; 3-(N,N-dimethyl-N-hexadecylammonio)-propane-1-sulfonate; 3-(N,N-dimethyl-N-hexadecylammonio)-2-hydroxy-propane-1-sulfonate; 4-[N,N-di(2(2-hydroxyethyl)-N(2-hydroxydodecyl)ammonio]-butane-1-carboxylate; 3-[S-ethyl-S-(3-dodecoxy-2-hydroxypropyl)sulfonio]-propane-1-phosphate; 3-[P,P-dimethyl-P-dodecylphosphonio]-propane-1-phosphonate; and S[N,N-di(3-hydroxypropyl)-N-hexadecylammonio]-2-hydroxy-pentane-1-sulfate. The alkyl groups contained in said detergent surfactants can be straight or branched and saturated or unsaturated.

Examples of zwitterionic surfactants include a betaine of the general structure:

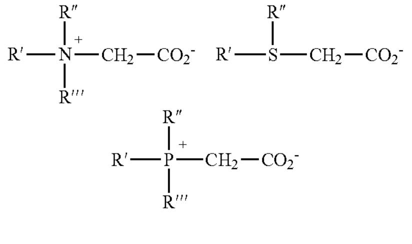

These surfactant betaines typically do not exhibit strong cationic or anionic characters at pH extremes nor do they show reduced water solubility in their isoelectric range. Unlike "external" quaternary ammonium salts, betaines are compatible with anionics. Examples of suitable betaines include coconut acylamidopropyldimethyl betaine; hexadecyl dimethyl betaine; $C_{12-14}$ acylamidopropylbetaine; $C_{8-14}$ acylamidohexyldiethyl betaine; 4-$C_{14-16}$ acylmethylamidodiethylammonio-1-carboxybutane; $C_{16-18}$ acylamidodimethylbetaine; $C_{12-16}$ acylamidopentanediethylbetaine; and $C_{12-16}$ acylmethylamidodimethylbetaine.

Sultaines useful in the present disclosure include those compounds having the formula $(R(R^1)_2 N^+R^2SO^{3-}$, in which R is a $C_6$-$C_{18}$ hydrocarbyl group, each $R^1$ is typically independently $C_1$-$C_3$ alkyl, e.g. methyl, and $R^2$ is a $C_1$-$C_6$ hydrocarbyl group, e.g. a $C_1$-$C_3$ alkylene or hydroxyalkylene group.

A typical listing of zwitterionic classes, and species of these surfactants, is given in U.S. Pat. No. 3,929,678 issued to Laughlin and Heuring on Dec. 30, 1975. Further examples are given in "Surface Active Agents and Detergents" (Vol. I and II by Schwartz, Perry and Berch). Each of these references are herein incorporated in their entirety.

In other embodiments, additional functional ingredients may be included in the cleaning compositions. The functional ingredients provide desired properties and functionalities to the compositions. For the purpose of this application, the term "functional ingredient" includes a material that when dispersed or dissolved in a use and/or concentrate solution, such as an aqueous solution, provides a beneficial property in the particular use of fryer and other hard surface cleaning. Some particular examples of functional materials are discussed in more detail below, although the particular materials discussed are given by way of example only, and that a broad variety of other functional ingredients may be used.

In other embodiments, the compositions may include additional defoaming agents, anti-redeposition agents, bleaching agents, solubility modifiers, dispersants, rinse aids, metal protecting agents, stabilizing agents, corrosion inhibitors, additional sequestrants and/or chelating agents (such as sodium gluconate), fragrances and/or dyes, additional rheology modifiers or thickeners, additional hydrotropes or couplers (such as sodium xylene sulfonate (SXS)), buffers, solvents and the like.

In an aspect, the compositions include from about 0 wt-% to about 30 wt-% additional functional ingredients, from about 0 wt-% to about 25 wt-% additional functional ingredients, from about 0.1 wt-% to about 25 wt-% additional functional ingredients, or from about 0.1 wt-% to about 20 wt-% additional functional ingredients. In addition, without being limited according to the disclosure, all ranges recited are inclusive of the numbers defining the range and include each integer within the defined range.

Methods of Use

The cleaning compositions are suitable for use in treating hard surfaces soiled with greasy soils. In a preferred aspect, the hard surface is a floor.

In an aspect, the cleaning composition can be in contact with the floor (or other hard surface in need of cleaning) for at least about 1 minute, at least about 2 minutes, at least about 3 minutes, at least about 4 minutes, at least about 5 minutes, at least about 6 minutes, at least about 7 minutes, at least about 8 minutes, at least about 9 minutes, at least about 10 minutes, at least about 11 minutes, at least about 12 minutes, at least about 13 minutes, at least about 14 minutes, or at least about 15 minutes.

Once the cleaning composition has been in contact with the floor(or other hard surface in need of cleaning) for a sufficient amount of time, the cleaning composition can be wiped from the floor and a brush, non-scratch pad or other device can be used to scrub any soiled surfaces. Thereafter, the surface can be rinsed with cold, room temperature or hot water. The floor(or other hard surface in need of cleaning) can then be dried using any conventional means, including for example, use of clean paper towels or allowing to air dry.

Methods of Manufacture

The cleaning compositions can be formed by combining the components in the weight percentages and ratios disclosed herein. The cleaning compositions are provided as a concentrate and/or use solution. Solid cleaning compositions can also be formed using a solidification matrix produced using a batch or continuous mixing system. In an exemplary embodiment, a single- or twin-screw extruder is used to combine and mix one or more agents at high shear to form a homogeneous mixture. In some embodiments, the processing temperature is at or below the melting temperature of the components. The processed mixture may be dispensed from the mixer by forming, casting or other suitable means, whereupon the cleaning composition hardens to a solid form. The structure of the matrix may be characterized according to its hardness, melting point, material distribution, crystal structure, and other like properties according to known methods in the art. Generally, a solid cleaning composition processed according to the methods disclosed herein are substantially homogeneous with regard to the distribution of ingredients throughout its mass and is dimensionally stable.

Specifically, in a forming process, the liquid and solid components are introduced into the final mixing system and are continuously mixed until the components form a substantially homogeneous semi-solid mixture in which the components are distributed throughout its mass. In an exemplary embodiment, the components are mixed in the mixing system for at least approximately 5 seconds. The mixture is then discharged from the mixing system into, or through, a die or other shaping means. The product is then packaged. In an exemplary embodiment, the formed composition begins to harden to a solid form in between approximately 1 minute and approximately 3 hours. Particularly, the formed composition begins to harden to a solid form in between approximately 1 minute and approximately 2 hours. More particularly, the formed composition begins to harden to a solid form in between approximately 1 minute and approximately 20 minutes.

Pressing can employ low pressures compared to conventional pressures used to form tablets or other conventional solid compositions. For example, in an embodiment, the present method employs a pressure on the solid of only less than or equal to about 5000 psi. In certain embodiments, the present method employs pressures of less than or equal to about 3500 psi, less than or equal to about 2500 psi, less than or equal to about 2000 psi, or less than or equal to about 1000 psi. In certain embodiments, the present method can employ pressures of about 1 to about 1000 psi, about 2 to about 900 psi, about 5 psi to about 800 psi, or about 10 psi to about 700 psi.

Specifically, in a casting process, the liquid and solid components are introduced into the final mixing system and are continuously mixed until the components form a substantially homogeneous liquid mixture in which the components are distributed throughout its mass. In an exemplary embodiment, the components are mixed in the mixing system for at least approximately 60 seconds. Once the mixing is complete, the product is transferred to a packaging container where solidification takes place. In an exemplary embodiment, the cast composition begins to harden to a solid form in between approximately 1 minute and approximately 3 hours. Particularly, the cast composition begins to harden to a solid form in between approximately 1 minute and approximately 2 hours. More particularly, the cast composition begins to harden to a solid form in between approximately 1 minute and approximately 20 minutes.

By the term "solid form", it is meant that the hardened composition will not flow and will substantially retain its shape under moderate stress or pressure or mere gravity. The degree of hardness of the solid cast composition may range from that of a fused solid product which is relatively dense and hard, for example, like concrete, to a consistency characterized as being a hardened paste. In addition, the term "solid" refers to the state of the detergent composition under the expected conditions of storage and use of the solid detergent composition. In general, it is expected that the detergent composition will remain in solid form when exposed to temperatures of up to approximately 100 degrees F. and particularly greater than approximately 120 degrees F.

The resulting solid cleaning composition may take forms including, but not limited to: a pressed solid; a cast solid product; an extruded, molded or formed solid pellet, block, tablet, powder, granule, flake; or the formed solid can thereafter be ground or formed into a powder, granule, or flake. In an exemplary embodiment, extruded pellet materials formed by the solidification matrix have a weight of between approximately 50 grams and approximately 250 grams, extruded solids formed by the solidification matrix have a weight of approximately 100 grams or greater, and solid block detergents formed by the solidification matrix have a mass of between approximately 1 and approximately 10 kilograms. The solid compositions provide for a stabilized source of functional materials. In some embodiments, the solid composition may be dissolved, for example, in an aqueous or other medium, to create a concentrated and/or use solution. The solution may be directed to a storage reservoir for later use and/or dilution or may be applied directly to a point of use. Alternatively, the solid cleaning composition is provided in the form of a unit dose, typically provided as a cast solid, an extruded pellet, or a tablet having a size of between approximately 1 gram and approximately 100 grams.

All publications and patent applications in this specification are indicative of the level of ordinary skill in the art to which this disclosure pertains. All publications and patent applications are herein incorporated by reference to the same extent as if each individual publication or patent application was specifically and individually indicated as incorporated by reference.

EXAMPLES

Embodiments of the present disclosure are further defined in the following non-limiting Examples. It should be understood that these Examples, while indicating certain embodiments of the disclosure, are given by way of illustration only. From the above discussion and these Examples, one skilled in the art can ascertain the essential characteristics of this disclosure, and without departing from the spirit and scope thereof, can make various changes and modifications of the embodiments of the disclosure to adapt it to various usages and conditions. Thus, various modifications of the embodiments of the disclosure, in addition to those shown and described herein, will be apparent to those skilled in the art from the foregoing description. Such modifications are also intended to fall within the scope of the appended claims. A listing of Chemicals and their reference names used in Examples is provided here:

| | |
|---|---|
| Plurafac SLF 180 | alcohol alkoxylate nonionic surfactant |
| Dehypon LS-36 | fatty alcohol (C12-14) with (EO)3(PO)6 |
| Dehypon LS-54 | fatty alcohol (C12-14) with (EO)5(PO)4 |
| Plurafac LF 221 | fatty alcohol, branched and linear, (C13-15) BO EO |
| Pluronic 25R2 | PO-EO-PO |
| Lutensol TDA-6 | ethoxylated tridecyl alcohol (C11-C14) with (EO)6 |
| Ecosurf EH-6 | alcohol alkoxylate EO-PO |
| Ecosurf EH-9 | alcohol alkoxylate EO-PO |
| Pluronic L62 | EO-PO block copolymer |
| Lutensol XP50 | Guerbet alcohol ethoxylate |

Sodium dodecylbenzenesulfonate, 96% (LAS):

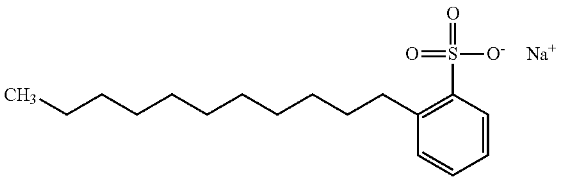 [SMILES: CCCCCCCCCCCc1ccccc1S(=O)(=O)[O-] ; [Na+]]

alpha Olefin Sulfonate (AOS):

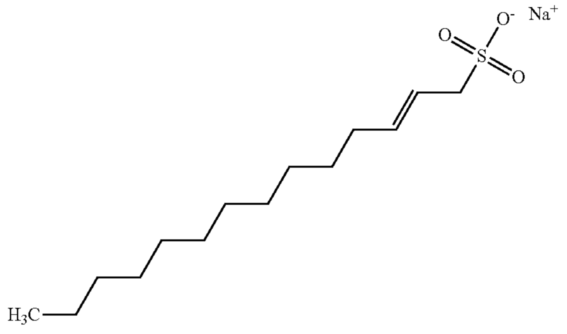 [SMILES: [Na+] ; CCCCCCCCCCC/C=C/CS(=O)(=O)[O-]]

Sodium Lauryl Sulfate (SLS):

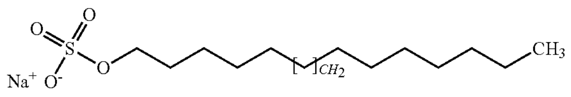

Secondary Alkane Sulfonate (SAS):

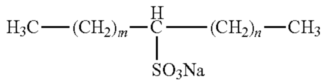

min 11-14
Average chain length: C15.2

Test Protocols

Title: Foam Test Method

Related ASTM Method(s):
Related European Test Method(s):

Materials 250 mL graduated cylinder(s) with stopper(s)
Cylinder inversion machine
Timer

Procedure

1. Add 40 mL of the test liquid to a 250 mL graduated cylinder. Affix a stopper and verify that it is secure.
2. Place the cylinder(s) into the inversion machine and adjust so that the cylinder(s) is secure.
3. Set the machine to a speed setting of 30 rpm and let it run for 3 minutes.
4. Quickly adjust the machine so that the cylinder is vertical. Record the foam height and start a timer.
5. Remove the cylinder(s) and place onto a flat surface, being careful not to disturb the liquid and foam.
6. After 2 minutes, record the foam heights.
7. Compare initial and 2 minute foam heights.

Red and Black Soil Test Method:

Procedure Overview: Vinyl tiles are soiled on the back, grooved side with approximately 3/4 gm of the specific soil using a foam brush. Soiled tiles are soaked in test product and allowed to soak for a fixed amount of time. Tiles are placed into a fixture along with a cellulosic sponge that is saturated with the test product to scrub the tiles. 2 lbs. pressure is applied to the sponge and scrubbing process begins using a Gardner Straight Line Abrasion Machine. Product cleaning efficiency is detected by a change in colorimeter readings before and after testing and is reported as change in reflectance.

Black Oily Soil Components

Low Odor Mineral Spirits
Mineral Oil
Motor Oil: 10 W/30
Oil Dag (Graphite Lube)
Black Charm Ball Clay Red Food Soil Components Lard
Corn Oil, 100%
Whole egg powder
Iron III oxide powder EXAMPLE 1: Foam Tests Many defoaming materials were tested with LAS and none of the ones tested made clear solutions and defoamed LAS to below a mid-level of foam. These foam test results are shown in Table 2.

TABLE 2

Foam Test Data for LAS with Defoamers

| Defoamer | Ratio (LAS:defoamer) | use soln observations | avg initial foam height (mL) | avg 2 min foam height (mL) |
|---|---|---|---|---|
| Airase 4500 | 9:1 | Clear, oily specks on top | 192.5 | 190 |
| Airase 4750V | 9:1 | Slt hazy, oily specks on top | 86.25 | 87.5 |
| | 6:1 | Slt hazy, oily specks on top | 74 | 71.5 |
| | 3:1 | Slt hazy, oily specks on top | 80.5 | 80.5 |
| Airase 4800 | 9:1 | Clear, oily specks on bottom | 91.5 | 90.5 |
| Airase 5100 | 9:1 | Clear | >250 | >250 |
| | 3:1 | Clear, difficult to dissolve | 244 | 240.5 |
| Airase 5200 | 9:1 | Clear | >250 | >250 |
| | 3:1 | V slt hazy, oily specks on top | 244 | 241 |
| Airase 5300 | 9:1 | Clear | >250 | >250 |
| | 3:1 | Clear, difficult to dissolve | 247 | 244.5 |
| Airase 5400 | 9:1 | Clear | >250 | >250 |
| | 3:1 | Clear, difficult to dissolve | >250 | >250 |
| Airase 5500 | 9:1 | Clear | >250 | >250 |
| | 3:1 | Clear, difficult to dissolve | >250 | >250 |
| Airase 5600 | 9:1 | Clear | >250 | >250 |
| | 3:1 | Clear, oily specks on top | >250 | >250 |
| Airase 5700 | 9:1 | Clear | >250 | >250 |
| | 3:1 | Clear, oily specks on top | >250 | >250 |
| Airase 8070 | 3:1 | Clear | >250 | >250 |
| | 2:1 | Clear | >250 | >250 |
| | 1:1 | Clear | >250 | >250 |
| DC 1520 | 9:1 | Clear, oily specks on top | 129.5 | 129.5 |
| Surfynol DF-37 | 3:1 | Clear | 157.5 | 157.5 |
| | 2:1 | Clear, floating oily specks | 156 | 154.5 |
| Surfynol DF-110C | 3:1 | Slt hazy, ppt floating in the middle | >250 | >250 |
| Surfynol DF-110D | 3:1 | Slt hazy, ppt floating in the middle | >250 | >250 |
| Surfynol DF-178 | 3:1 | Slt hazy | 219 | 215 |
| Surfynol DF-220 | 9:1 | Slt hazy, oily specks on top | 107 | 105 |
| | 6:1 | Slt hazy, oily specks on top | 76 | 74.75 |
| | 3:1 | Slt hazy, oily specks on top | 60.5 | 55 |
| Surfynol MD-20 | 3:1 | Slt hazy | 206.5 | 204 |
| Surfynol MD-610S | 3:1 | Clear, slt ppt | >250 | >250 |
| PPG 2000 | 3:1 | Clear | 171.5 | 169.5 |
| | 2:1 | Clear, oily specks on bottom | 183 | 181.5 |
| PPG 4000 | 3:1 | Clear, oily specks on bottom | >250 | >250 |
| Abil B 8832 | 9:1 | Clear | >250 | >250 |
| | 6:1 | Clear | >250 | >250 |
| Abil B 9950 | 9:1 | Clear | >250 | >250 |
| | 6:1 | Clear | >250 | >250 |
| Tegopren 5840 | 9:1 | Clear | >250 | >250 |
| | 6:1 | Clear | >250 | >250 |
| Tegopren 5843 | 9:1 | Clear | >250 | >250 |
| | 6:1 | Clear | >250 | >250 |
| Tegopren 5847 | 9:1 | Clear | >250 | >250 |
| | 6:1 | Clear | 247.5 | 247.5 |
| Tegopren 5852 | 9:1 | Clear | >250 | >250 |
| | 6:1 | Clear | >250 | >250 |
| Tegopren 5885 | 9:1 | V slt hazy | >250 | >250 |

Foam tests were run for commercial cleaners and various nonionic surfactants alone. The results are in Table 3.

Commercial Product A is high foaming.

Commercial Product B has no LAS and has high cloud point nonionics.

Commercial Product C has no LAS, has high cloud point nonionics, is high foaming, and is alkaline.

Commercial Product D has no LAS, has high cloud point nonionics, and is alkaline.

Commercial Product E has no LAS, has high cloud point nonionics, and is high foaming.

Commercial Floorcare Product F hashigh cloud point nonionics, is high foaming, and is alkaline.

TABLE 3

Foam Test Data for Commercial Products and Surfactants alone

| Surfactant | use soln observations | avg initial foam height (mL) | avg 2 min foam height (mL) |
|---|---|---|---|
| Commercial Product B | Clear | 74.5 | 59.5 |
| Commercial Product C | Clear | 209 | 206.5 |
| Commercial Product E | Clear | 216.5 | 216 |
| Commercial Floorcare Product F | Clear | >250 | >250 |
| Dehypon LS-36 | Cloudy | 40 | 40 |
| Dehypon LS-54 | Clear | 86 | 83.5 |
| Plurafac LF 221 | Clear | 84.5 | 82 |
| Plurafac SLF180 | Slt hazy | 49 | 40 |
| Pluronic 25R2 | Clear | 64.5 | 45 |
| Ecosurf EH-6 | Clear | 60.5 | 46 |
| Ecosurf EH-9 | Clear | 73 | 67.5 |

Next, many nonionic surfactants were tested in combination with LAS (Table 4) in various ratios.

TABLE 4

Foam test data LAS

| Defoamer | Ratio (LAS:de-foamer) | use soln observations | avg initial foam height (mL) | avg 2 min foam height (mL) |
|---|---|---|---|---|
| None | — | Clear | >250 | >250 |
| Plurafac SLF180 | 9:1 | Clear | 218.25 | 218.25 |
| | 6:1 | Clear | 198 | 198 |
| | 3:1 | Clear | 183.5 | 183.5 |
| | 2:1 | Clear | 163 | 163 |
| | 1:1 | Clear | 118 | 118 |
| Plurafac LF221 | 3:1 | Clear | 214 | 214 |
| | 2:1 | Clear | 186 | 186 |
| | 1:1 | Clear | 169.5 | 169.5 |
| Dehypon LS-36 | 3:1 | Clear | 215.5 | 215.5 |
| | 2:1 | Clear | 196.5 | 196 |
| | 1:1 | Clear | 146 | 145 |
| Dehypon LS-54 | 2:1 | Clear | 213.5 | 213 |
| | 1:1 | Clear | 177 | 177 |
| Pluronic 25R2 | 2:1 | Clear | 211.5 | 211 |
| | 1:1 | Clear | 171.5 | 171 |
| Lutensol TDA-6 | 9:1 | Clear | >250 | >250 |
| | 6:1 | Slt hazy | 217.5 | 217 |
| | 3:1 | Slt hazy | 241 | 241 |
| | 2:1 | Slt hazy | 229 | 228.5 |
| | 1:1 | Hazy | 206 | 205.5 |
| Ecosurf EH-6 | 1:1 | Clear | 209 | 208 |
| Ecosurf EH-9 | 1:1 | Clear | 223.5 | 222.5 |
| Pluronic L62 | 1:1 | Clear | 222.5 | 222 |
| Lutensol XP50 | 9:1 | Clear | >250 | >250 |
| | 6:1 | V slt hazy | 226 | 224.5 |

TABLE 4-continued

Foam test data LAS

| Defoamer | Ratio (LAS:de-foamer) | use soln observations | avg initial foam height (mL) | avg 2 min foam height (mL) |
|---|---|---|---|---|
| | 3:1 | Slt hazy | >250 | >250 |
| | 2:1 | Slt hazy | 231.5 | 231.5 |
| | 1:1 | Hazy | 192 | 191.5 |

Pluronic SLF 180 and Dehypon LS-36 were the most effective at defoaming LAS. Both have higher PO content than EQ content and have cloud points below room temp. The cloud point data for the nonionic surfactants tested is listed in Table 5.

TABLE 5

Cloud Point Data

| Surfactant | Cloud Point (1% aqueous solution) | Description |
|---|---|---|
| Plurafac SLF 180 | 16-21 C. | alcohol alkoxylate nonionic surfactant |
| Dehypon LS-36 | 10-12 C. | fatty alcohol (C12-14) with EO(3)PO(6) |
| Dehypon LS-54 | 28-31 C. | fatty alcohol (C12-14) with EO(5)PO(4) |
| Plurafac LF 221 | 33 C. | fatty alcohol, branched and linear, (C13-15) BO EO |
| Pluronic 25R2 | 26-33 C. | PO-EO-PO |
| Lutensol TDA-6 | dispersable | ethoxylated tridecyl alcohol (C11-C14) with (EO)6 |
| Ecosurf EH-6 | 43 C. | alcohol alkoxylate EO-PO |
| Ecosurf EH-9 | 64 C. | alcohol alkoxylate EO-PO |
| Pluronic L62 | 32 C. | EO-PO block copolymer |
| Lutensol XP50 | dispersable | Guerbet alcohol ethoxylate |

Next, a selection of low cloud point nonionic surfactants were tested in combination with AOS (Table 6), SLS (Table 7) and SAS (Table 8) in various ratios.

TABLE 6

Foam test data AOS

| Defoamer | Ratio (AOS:de-foamer) | use soln observations | avg initial foam height (mL) | avg 2 min foam height (mL) |
|---|---|---|---|---|
| None | — | Clear | >250 | >250 |
| Plurafac SLF180 | 3:1 | Clear | 218 | 218 |
| | 2:1 | Clear | 206.5 | 206.5 |
| | 1:1 | Clear | 202 | 201.5 |
| Plurafac LF221 | 9:1 | Clear | 217 | 217 |
| | 6:1 | Clear | 208.5 | 208.5 |
| | 3:1 | Clear | 205.5 | 205.5 |
| | 2:1 | Clear | 194.5 | 194.5 |
| | 1:1 | Clear | 168 | 167 |
| Dehypon LS-36 | 3:1 | Clear | 212 | 212 |
| | 2:1 | Clear | 200.5 | 200 |
| | 1:1 | Clear | 198.5 | 196.5 |
| Dehypon LS-54 | 6:1 | Clear | 212.5 | 212.5 |
| | 3:1 | Clear | 205 | 205 |
| | 2:1 | Clear | 189 | 188.5 |
| | 1:1 | Clear | 190 | 187.5 |
| Pluronic 25R2 | 1:1 | Clear | 235.5 | 235.5 |

TABLE 7

| Foam test data SLS | | | | |
|---|---|---|---|---|
| Defoamer | Ratio (SLS:defoamer) | use soln observations | avg initial foam height (mL) | avg 2 min foam height (mL) |
| None | — | Hazy | 129.5 | 129.5 |
| Plurafac SLF180 | 2:1 | Clear | 160.5 | 160.5 |
| | 1:1 | Clear | 217 | 216.5 |
| Plurafac LF221 | 3:1 | Clear | 140.5 | 140.5 |
| | 2:1 | Clear | 199.5 | 199.5 |
| | 1:1 | Clear | 207.5 | 207.5 |
| Dehypon LS-36 | 3:1 | Clear | 171.5 | 171.5 |
| | 2:1 | Clear | 196.5 | 196.5 |
| | 1:1 | Clear | 232.5 | 232.5 |
| Dehypon LS-54 | 2:1 | Clear | 180.5 | 180.5 |
| | 1:1 | Clear | 209.5 | 209.5 |
| Pluronic 25R2 | 1:1 | Clear | 245 | 245 |

TABLE 8

| Foam test data SAS | | | | |
|---|---|---|---|---|
| Defoamer | Ratio (SAS:defoamer) | use soln observations | avg initial foam height (mL) | avg 2 min foam height (mL) |
| None | — | Clear | 229.5 | 229 |
| Plurafac SLF180 | 9:1 | Clear | 223 | 223 |
| | 6:1 | Clear | 198.5 | 197.5 |
| | 3:1 | Clear | 201 | 201 |
| | 2:1 | Clear | 157 | 157 |
| | 1:1 | Clear | 121.5 | 121.5 |
| Plurafac LF221 | 9:1 | Clear | 207.5 | 206.5 |
| | 6:1 | Clear | 202.5 | 202.5 |
| | 3:1 | Clear | 200.5 | 200.5 |
| | 2:1 | Clear | 160.5 | 160.5 |
| | 1:1 | Clear | 147 | 146.5 |
| Dehypon LS-36 | 9:1 | Clear | 196 | 195.5 |
| | 6:1 | Clear | 198 | 198 |
| | 3:1 | Clear | 181 | 180.5 |
| | 2:1 | Clear | 186 | 186 |
| | 1:1 | Clear | 146.5 | 146.5 |
| Dehypon LS-54 | 6:1 | Clear | 210.5 | 210.5 |
| | 3:1 | Clear | 193 | 193 |
| | 2:1 | Clear | 170.5 | 170.5 |
| | 1:1 | Clear | 166 | 166 |
| Pluronic 25R2 | 1:1 | Clear | 235.5 | 235 |

As the results show, many nonionic surfactants were tested with various anionic surfactants. Of these surfactants, Plurafac SLF180 and Dehypon LS-36 defoamed LAS the best and reduced the foam height to a mid-foaming range. None of the nonionic surfactants were able to defoam the AOS to the same level, although some level of defoaming was observed. The SLS solution was hazy and did not have a high foam level. Adding the nonionics clarified the solution, but were foamier. Pluronic 25R2 is the least efficient defoaming nonionic for LAS, AOS, SLS, and SAS. The other nonionics vary depending on the RM that is defoamed. The 2 that are fairly easily defoamed with the nonionic surfactants are LAS and SAS. These nonionic surfactants were capable of defoaming LAS more fully than the other nonionics.

EXAMPLE 2: Red and Black Soil Tests with Commerical Cleaners and Nonionics

Next the various low cloud point nonionic surfactants were tested for cleaning with Red and Black Soil in an ash (carbonate) or percarbonate based hard surface cleaning solution with the surfactant package present as indicated.

Tested nonionic surfactants includes Plurafac SLF 180, Plurafac LF221, Dehypon LS-36, Dehypon LS-54, and Pluronic 25R2. This was tested against commercial hard surface cleaners. The Red Soil results are in Table 9 and the Black Soil results are in Table 10.

TABLE 9

| Red Soil Test Results for Commercial Cleaners and Nonionics | | | | |
|---|---|---|---|---|
| Products | Conc. (oz/gal) | use soln observations | Avg Delta L* | Avg Std Dev |
| 5 gpg Water | 0.00 | Clear | 33.91 | 0.81 |
| Commercial Product A | 0.90 | Clear | 36.57 | 0.59 |
| | 2.00 | Clear | 45.97 | 1.30 |
| | 8.00 | Clear | 51.28 | 0.33 |
| Commercial Product B | 2.00 | Clear | 31.82 | 0.82 |
| | 4.00 | Clear | 38.89 | 0.21 |
| Commercial Product C | 2.00 | Clear | 32.39 | 0.08 |
| | 4.00 | Clear | 36.54 | 0.20 |
| Commercial Product D | 0.50 | Clear | 30.14 | 0.21 |
| | 1.00 | Clear | 29.56 | 1.26 |
| | 2.00 | Clear | 31.31 | 0.05 |
| Commercial Product E | 2.00 | Clear | 40.08 | 1.46 |
| Commercial Floorcare Product F | 1.00 | Clear | 37.75 | 0.89 |
| | 1.50 | Clear | 41.43 | 0.15 |
| | 2.00 | Clear | 47.12 | 0.14 |
| Experimental 1 (SLF180) | 2.00 | Cloudy | 37.20 | 0.43 |
| | 4.00 | Cloudy | 37.73 | 0.20 |
| Experimental 2 (LF 221) | 2.00 | Clear | 35.19 | 0.20 |
| | 4.00 | Clear | 35.09 | 0.42 |
| Experimental 3 (LS-36) | 2.00 | V Hazy | 33.19 | 0.56 |
| | 4.00 | Cloudy | 35.20 | 0.92 |
| Experimental 4 (LS-54) | 2.00 | Clear | 34.18 | 0.85 |
| | 4.00 | Clear | 35.06 | 0.24 |
| Experimental 5 (25R2) | 2.00 | Clear | 33.44 | 0.07 |
| | 4.00 | Clear | 34.15 | 0.21 |

TABLE 10

| Black Soil Test Results for Commercial Cleaners and Nonionics | | | | |
|---|---|---|---|---|
| Products | Conc. (oz/gal) | use soln observations | Avg Delta L* | Avg Std Dev |
| 5 gpg Water | 0 | Clear | 21.28 | 0.73 |
| Commercial Product A | 8.00 | Clear | 38.99 | 1.145 |
| Commercial Product B | 2.00 | Clear | 22.68 | 0.555 |
| Commercial Product C | 2.00 | Clear | 18.19 | 0.825 |
| Commercial Product D | 2.00 | Clear | 28.26 | 0.395 |
| Commercial Product E | 2.00 | Clear | 3.01 | 0.065 |
| Commercial Floorcare Product F | 0.50 | Clear | 24.30 | 0.38 |
| Experimental 1 (SLF180) | 2.00 | Cloudy | 29.83 | 1.42 |
| | 4.00 | Cloudy | 30.16 | 0.65 |
| Experimental 2 (LF 221) | 2.00 | Clear | 28.88 | 0.95 |
| | 4.00 | Clear | 31.19 | 0.11 |
| Experimental 3 (LS-36) | 2.00 | V Hazy | 25.33 | 0.60 |
| | 4.00 | Cloudy | 26.42 | 0.35 |
| Experimental 4 (LS-54) | 2.00 | Clear | 28.11 | 0.47 |
| | 4.00 | Clear | 32.41 | 0.66 |
| Experimental 5 (25R2) | 2.00 | Clear | 29.22 | 0.19 |
| | 4.00 | Clear | 31.88 | 0.80 |

EXAMPLE 3: Red and Black Soil Tests with LAS

The Red Soil test results are shown below in Table 11. As can be seen, LAS in combination with any of the nonionic surfactants at a 2:1 ratio of LAS:surfactant worked better than either the nonionic surfactant alone or LAS alone and demonstrated superior red soil removal than the traditional commercially available red soil cleaner which is high foaming. LAS in combination with Plurafac SLF 180 even had superior cleaning at a 9:1 ratio ofLAS:surfactant. Thus, showing a synergistic cleaning effect with these combinations.

TABLE 11

LAS Red Soil Test Results

| Products | Conc. (oz/gal) | use soln observations | Avg Delta L* | Avg Std Dev |
|---|---|---|---|---|
| LAS Experimental 1 | 2.00 | Clear | 33.82 | 0.88 |
| (LAS) | 4.00 | Clear | 38.51 | 0.77 |
| LAS Experimental 2 | 2.00 | Clear | 35.87 | 0.97 |
| (LAS, SLF180; 9:1) | 4.00 | Clear | 44.49 | 0.84 |
| LAS Experimental 3 | 2.00 | Clear | 34.53 | 0.32 |
| (LAS, SLF180; 2:1) | 4.00 | Clear | 48.14 | 0.14 |
| LAS Experimental 4 | 2.00 | Clear | 32.91 | 0.41 |
| (LAS, LF221; 3:1) | 4.00 | Slt Hazy | 44.01 | 0.55 |
| LAS Experimental 5 | 2.00 | Clear | 34.72 | 0.79 |
| (LAS, LF221; 2:1) | 4.00 | Clear | 46.88 | 1.45 |
| LAS Experimental 6 | 2.00 | Clear | 34.23 | 1.40 |
| (LAS, LS-36; 3:1) | 4.00 | V Hazy | 47.44 | 4.60 |
| LAS Experimental 7 | 2.00 | Clear | 35.63 | 1.18 |
| (LAS, LS-36; 2:1) | 4.00 | V Hazy | 45.49 | 1.31 |
| LAS Experimental 8 | 2.00 | Clear | 33.60 | 0.63 |
| (LAS, LS-54; 2:1) | 4.00 | Clear | 44.41 | 0.69 |
| LAS Experimental 9 | 2.00 | Clear | 38.91 | 2.84 |
| (LAS, 25R2; 2:1) | 4.00 | Clear | 49.31 | 3.65 |

Next black soil tests were run on the same surfactant combinations. The results are shown in Table 12. As can be seen, LAS in combination with either Pluronic 25R2 at 2:1, Plurafac SLF 180 at 2:1, Dehypon LS-36 at 2:1, Dehypon LS-54 at 2:1, or Plurafac LF 221 at 2:1 worked better than the nonionic surfactant alone and demonstrated superior black soil removal than the traditional commercially available black soil cleaner which is high foaming.

TABLE 12

LAS Black Soil Test Results

| Products | Conc. (oz/gal) | use soln observations | Avg Delta L* | Avg Std Dev |
|---|---|---|---|---|
| LAS Experimental 1 | 2.00 | Clear | 31.74 | 0.83 |
| (LAS) | 4.00 | Clear | 38.78 | 7.43 |
| LAS Experimental 2 | 2.00 | Clear | 30.94 | 0.13 |
| (LAS, SLF180; 9:1) | 4.00 | Clear | 42.67 | 1.20 |
| LAS Experimental 3 | 2.00 | Clear | 32.51 | 0.65 |
| (LAS, SLF180; 2:1) | 4.00 | Clear | 36.47 | 0.89 |
| LAS Experimental 4 | 2.00 | Clear | 29.27 | 0.31 |
| (LAS, LF221; 3:1) | 4.00 | Slt Hazy | 39.58 | 0.29 |
| LAS Experimental 5 | 2.00 | Clear | 28.45 | 0.27 |
| (LAS, LF221; 2:1) | 4.00 | Clear | 34.89 | 0.99 |
| LAS Experimental 6 | 2.00 | Clear | 26.80 | 0.75 |
| (LAS, LS-36; 3:1) | 4.00 | V Hazy | 35.04 | 0.31 |
| LAS Experimental 7 | 2.00 | Clear | 31.24 | 0.59 |
| (LAS, LS-36; 2:1) | 4.00 | V Hazy | 36.80 | 0.65 |
| LAS Experimental 8 | 2.00 | Clear | 29.78 | 0.59 |
| (LAS, LS-54; 2:1) | 4.00 | Clear | 35.38 | 0.61 |
| LAS Experimental 9 | 2.00 | Clear | 31.60 | 2.26 |
| (LAS, 25R2; 2:1) | 4.00 | Clear | 35.82 | 0.31 |

EXAMPLE 4: Red and Black Soil Tests with AOS, SLS, and SAS

Red Soil tests were run with alpha olefin sulfonate (AOS), sodium lauryl sulfate (SLS), and secondary alkane sulfonate (SAS) all cleaned worse than LAS on black soil. The only significant cleaning synergies found were with LAS. LAS cleans red soil, but performs significantly better with a nonionic surfactant. AOS cleans red soil, but performs worse with a nonionic surfactant. SLS cleans well on red soil but performs worse with a nonionic surfactant. SAS cleans decently on red soil, but in most cases performs slightly worse with a nonionic surfactant. The only one that showed great cleaning synergies is LAS.

As the data shows, for red soil cleaning, LAS in combination with any of the nonionic surfactants at a 2:1 ratio of LAS:surfactant worked better than either the nonionic surfactant alone or LAS alone and demonstrated superior red soil removal than the traditional commercially available red soil cleaners, which are high foaming. LAS in combination with Plurafac SLF 180 even had superior cleaning at a 9:1 ratio of LAS:surfactant. Thus, showing a synergistic cleaning effect with these combinations. Results are shown in Table 13.

TABLE 13

AOS, SLS, and SLS Red Soil Test Results

| Products | Conc. (oz/gal) | use soln observations | Avg Delta L* | Avg Std Dev |
|---|---|---|---|---|
| AOS Experimental 1 | 2.00 | Clear | 34.84 | 0.34 |
| (AOS) | 4.00 | Clear | 39.99 | 2.12 |
| AOS Experimental 2 | 2.00 | Clear | 34.39 | 0.38 |
| (AOS, SLF180; 3:1) | 4.00 | Clear | 37.63 | 0.37 |
| AOS Experimental 3 | 2.00 | Clear | 34.87 | 0.02 |
| (AOS, SLF180; 2:1) | 4.00 | Clear | 36.86 | 0.29 |
| AOS Experimental 4 | 2.00 | Clear | 34.84 | 0.65 |
| (AOS, LF221; 9:1) | 4.00 | Clear | 37.45 | 0.46 |
| AOS Experimental 5 | 2.00 | Clear | 35.25 | 0.79 |
| (AOS, LF221; 2:1) | 4.00 | Clear | 38.24 | 0.93 |
| AOS Experimental 6 | 2.00 | Clear | 35.76 | 0.20 |
| (AOS, LS-36; 3:1) | 4.00 | Clear | 35.77 | 0.05 |
| AOS Experimental 7 | 2.00 | Clear | 34.21 | 0.36 |
| (AOS, LS-36; 2:1) | 4.00 | Clear | 36.30 | 0.16 |
| AOS Experimental 8 | 2.00 | Clear | 35.15 | 0.11 |
| (AOS, LS-54; 6:1) | 4.00 | Clear | 37.75 | 1.40 |
| AOS Experimental 9 | 2.00 | Clear | 34.67 | 0.60 |
| (AOS, LS-54; 2:1) | 4.00 | Clear | 35.06 | 0.02 |
| SLS Experimental 1 | 2.00 | Clear | 35.99 | 0.74 |
| (SLS) | 4.00 | Clear | 43.98 | 2.12 |
| SLS Experimental 2 | 2.00 | Clear | 34.72 | 0.41 |
| (SLS, SLF180; 2:1) | 4.00 | Clear | 39.38 | 0.56 |
| SLS Experimental 3 | 2.00 | Clear | 34.77 | 0.72 |
| (SLS, LF221; 3:1) | 4.00 | Clear | 41.22 | 0.05 |
| SLS Experimental 4 | 2.00 | Clear | 35.45 | 0.15 |
| (SLS, LF221; 2:1) | 4.00 | Clear | 41.29 | 1.71 |
| SLS Experimental 5 | 2.00 | Clear | 37.38 | 0.81 |
| (SLS, LS-36; 3:1) | 4.00 | Clear | 40.10 | 0.33 |
| SLS Experimental 6 | 2.00 | Clear | 35.15 | 1.54 |
| (SLS, LS-36; 2:1) | 4.00 | Clear | 39.47 | 0.51 |
| SLS Experimental 7 | 2.00 | Clear | 34.89 | 0.09 |
| (SLS, LS-54; 2:1) | 4.00 | Clear | 39.37 | 0.20 |
| SAS Experimental 1 | 2.00 | Clear | 31.19 | 0.89 |
| (SAS) | 4.00 | Clear | 36.64 | 1.08 |
| SAS Experimental 2 | 2.00 | Clear | 32.34 | 0.66 |
| (SAS, SLF180; 9:1) | 4.00 | Clear | 39.39 | 0.70 |
| SAS Experimental 3 | 2.00 | Clear | 33.91 | 0.06 |
| (SAS, SLF180; 2:1) | 4.00 | Clear | 34.63 | 0.66 |
| SAS Experimental 4 | 2.00 | Clear | 33.84 | 0.26 |
| (SAS, LF221; 9:1) | 4.00 | Clear | 37.65 | 0.83 |
| SAS Experimental 5 | 2.00 | Clear | 32.80 | 0.13 |
| (SAS, LF221; 2:1) | 4.00 | Clear | 35.53 | 0.04 |
| SAS Experimental 6 | 2.00 | Clear | 33.05 | 0.23 |
| (SAS, LS-36; 9:1) | 4.00 | Clear | 35.81 | 0.98 |
| SAS Experimental 7 | 2.00 | Clear | 31.97 | 0.09 |
| (SAS, LS-36; 2:1) | 4.00 | Clear | 33.52 | 0.84 |
| SAS Experimental 8 | 2.00 | Clear | 32.61 | 0.76 |
| (SAS, LS-54; 6:1) | 4.00 | Clear | 35.77 | 0.81 |
| SAS Experimental 9 | 2.00 | Clear | 34.07 | 0.36 |
| (SAS, LS-54; 2:1) | 4.00 | Clear | 37.44 | 1.39 |

Black soil tests demonstrated that LAS in combination with either Pluronic 25R2 at 2:1, Plurafac SLF 180 at 2:1, Dehypon LS-36 at 2:1, Dehypon LS-54 at 2:1, or Plurafac LF 221 worked better than the nonionic surfactant alone and demonstrated superior black soil removal compared to the traditional commercially available black soil cleaner which is high foaming. The addition of nonionics either reduced cleaning of LAS showing an antagonistic effect on cleaning or had no effect. LAS cleans black soil and with a small amount on nonionic. As larger amounts were added, the cleaning decreased.

With regard to different anionic surfactants, nonlinear alkyl sulfonates, alpha olefin sulfonate (AOS), sodium lauryl sulfate (SLS), and secondary alkane sulfonate (SAS) all cleaned worse than LAS on black soil. The addition of nonionics either reduced cleaning showing an antagonistic effect on cleaning or had no effect. Results are shown in Table 14.

TABLE 14

AOS, SLS, and SLS Black Soil Test Results

| Products | Conc. (oz/gal) | use soln observations | Avg Delta L* | Avg Std Dev |
|---|---|---|---|---|
| AOS Experimental 1 | 2.00 | Clear | 27.86 | 0.90 |
| (AOS) | 4.00 | Clear | 32.14 | 0.82 |
| AOS Experimental 2 | 2.00 | Clear | 28.22 | 0.97 |
| (AOS, SLF180; 3:1) | 4.00 | Clear | 29.08 | 1.17 |
| AOS Experimental 3 | 2.00 | Clear | 27.83 | 0.20 |
| (AOS, SLF180; 2:1) | 4.00 | Clear | 30.75 | 0.32 |
| AOS Experimental 4 | 2.00 | Clear | 25.95 | 0.06 |
| (AOS, LF221; 9:1) | 4.00 | Clear | 28.32 | 1.47 |
| AOS Experimental 5 | 2.00 | Clear | 27.14 | 0.14 |
| (AOS, LF221; 2:1) | 4.00 | Clear | 30.10 | 1.42 |
| AOS Experimental 6 | 2.00 | Clear | 26.23 | 1.02 |
| (AOS, LS-36; 3:1) | 4.00 | Clear | 28.33 | 1.03 |
| AOS Experimental 7 | 2.00 | Clear | 26.33 | 0.88 |
| (AOS, LS-36; 2:1) | 4.00 | Clear | 29.53 | 1.25 |
| AOS Experimental 8 | 2.00 | Clear | 27.12 | 0.61 |
| (AOS, LS-54; 6:1) | 4.00 | Clear | 30.92 | 0.44 |
| AOS Experimental 9 | 2.00 | Clear | 27.51 | 0.64 |
| (AOS, LS-54; 2:1) | 4.00 | Clear | 28.30 | 0.40 |
| SLS Experimental 1 | 2.00 | Clear | 29.70 | 0.49 |
| (SLS) | 4.00 | Clear | 34.82 | 0.87 |
| SLS Experimental 2 | 2.00 | Clear | 30.02 | 0.79 |
| (SLS, SLF180; 2:1) | 4.00 | Clear | 32.99 | 0.07 |
| SLS Experimental 3 | 2.00 | Clear | 29.93 | 0.43 |
| (SLS, LF221; 3:1) | 4.00 | Clear | 32.23 | 1.06 |
| SLS Experimental 4 | 2.00 | Clear | 29.96 | 1.63 |
| (SLS, LF221; 2:1) | 4.00 | Clear | 31.73 | 1.74 |
| SLS Experimental 5 | 2.00 | Clear | 28.87 | 0.63 |
| (SLS, LS-36; 3:1) | 4.00 | Clear | 31.80 | 0.38 |
| SLS Experimental 6 | 2.00 | Clear | 29.99 | 0.30 |
| (SLS, LS-36; 2:1) | 4.00 | Clear | 30.98 | 1.10 |
| SLS Experimental 7 | 2.00 | Clear | 31.51 | 0.74 |
| (SLS, LS-54; 2:1) | 4.00 | Clear | 33.19 | 0.45 |
| SAS Experimental 1 | 2.00 | Clear | 30.30 | 0.35 |
| (SAS) | 4.00 | Clear | 33.77 | 0.26 |
| SAS Experimental 2 | 2.00 | Clear | 29.90 | 1.17 |
| (SAS, SLF180; 9:1) | 4.00 | Clear | 33.38 | 1.65 |
| SAS Experimental 3 | 2.00 | Clear | 31.58 | 0.20 |
| (SAS, SLF180; 2:1) | 4.00 | Clear | 34.27 | 2.74 |
| SAS Experimental 4 | 2.00 | Clear | 29.49 | 0.02 |
| (SAS, LF221; 9:1) | 4.00 | Clear | 32.16 | 0.61 |
| SAS Experimental 5 | 2.00 | Clear | 29.73 | 0.99 |
| (SAS, LF221; 2:1) | 4.00 | Clear | 32.57 | 0.60 |
| SAS Experimental 6 | 2.00 | Clear | 29.77 | 1.30 |
| (SAS, LS-36; 9:1) | 4.00 | Clear | 31.35 | 0.83 |
| SAS Experimental 7 | 2.00 | Clear | 29.06 | 0.04 |
| (SAS, LS-36; 2:1) | 4.00 | Clear | 30.83 | 0.75 |
| SAS Experimental 8 | 2.00 | Clear | 27.91 | 0.43 |
| (SAS, LS-54; 6:1) | 4.00 | Clear | 31.81 | 0.16 |
| SAS Experimental 9 | 2.00 | Clear | 29.61 | 0.95 |
| (SAS, LS-54; 2:1) | 4.00 | Clear | 33.85 | 1.15 |

The disclosures being thus described, it will be obvious that the same may be varied in many ways. Such variations are not to be regarded as a departure from the spirit and scope of the disclosures and all such modifications are intended to be included within the scope of the following claims. The above specification provides a description of the manufacture and use of the disclosed compositions and methods. Since many embodiments can be made without departing from the spirit and scope of the disclosure, the disclosure resides in the claims.

What is claimed is:

1. A surfactant package for hard surface cleaning compositions that is effective on both food and oily soils comprising:

one or more anionic linear alkyl sulfonate surfactants; and one or more nonionic ethoxylated propoxylated alcohol surfactants or ethoxylated propoxylated fatty alcohol surfactants, said nonionic surfactant with a ratio of propoxylation to ethoxylation of greater than 1, wherein the ratio of anionic surfactant to nonionic surfactant is between 6:1 and 9:1, and wherein the surfactant package is free of a short chain alkyl benzene hydrotrope.

2. A surfactant package for hard surface cleaning compositions that is effective on both food and oily soils comprising:

one or more anionic linear alkyl sulfonate surfactants; and one or more nonionic alcohol alkoxylate surfactant or nonionic fatty alcohol surfactants, said nonionic surfactants having a cloud point that is below 23° C., wherein the ratio of anionic surfactant to nonionic surfactant is between 2-46:1 and 9:1, and wherein the surfactant package is free of a short chain alkyl benzene hydrotrope.

3. The surfactant package of claim 1, wherein said linear alkyl sulfonate surfactant is linear alkyl benzene sulfonate.

4. The surfactant package of claim 1 wherein said nonionic surfactant has a ratio of propoxylation to ethoxylation of 2:1.

5. The surfactant package of claim 4 wherein said nonionic surfactant is a C12 to C14 fatty alcohol with (EO)3 (PO)6.

6. The surfactant package of claim 1 wherein said nonionic surfactant is an alcohol alkoxylate.

7. The surfactant package of claim 1 wherein said nonionic surfactant is a reverse EO/PO block copolymer.

8. The surfactant package of claim 1 wherein the surfactant package does not include alpha olefin sulfonate (AOS).

9. The surfactant package of claim 1 wherein the surfactant package does not include sodium lauryl sulfate (SLS).

10. The surfactant package of claim 1 wherein the surfactant package does not include a secondary alkane sulfonate (SAS).

11. The surfactant package of claim 1 wherein said surfactant package includes 2 or more nonionic surfactant selected from the group consisting of ethoxylated propoxylated alcohol surfactants or ethoxylated propoxylated fatty alcohol surfactants.

12. The surfactant package of claim 1 wherein said surfactant package includes 2 or more linear alkyl sulfonates.

13. A hard surface or floor cleaning composition comprising the surfactant package of claim 1.

14. A composition comprising the surfactant package of claim 1.

15. The hard surface or floor cleaning composition of claim 13 further comprising one or more of an alkalinity source, a stabilizer, and/or a pH adjuster.

16. The hard surface or floor cleaning composition of claim 13 wherein said composition has a pH of about 7 to about 9.

17. The hard surface or floor cleaning composition of claim 13 wherein said composition is a solid.

18. The hard surface or floor cleaning composition of claim 13 wherein said composition is a pressed solid.

19. The hard surface or floor cleaning composition of claim 13 wherein said composition is used in an automatic cleaning unit.

20. The hard surface or floor cleaning composition of claim 13 wherein said composition is used in an abrasion suction automatic cleaning unit.

21. A method of cleaning a floor or hard surface comprising:

contacting a composition according to claim 1 with a floor or hard surface; and thereafter removing the composition from said surface.

22. The method of claim 21, wherein the contacting of the composition is for a sufficient period of time to emulsify food and oily soils.

23. The method of claim 21, further comprising rinsing said surface.

24. The method of claim 21, further comprising scrubbing the surface.

25. The method of claim 24, further comprising rinsing the surface with water after scrubbing.

26. A method of making a cleaning composition comprising combining the surfactant package of claim 1 with one or more additional functional ingredients to form a cleaning composition.

27. The method of claim 26 wherein said combined composition is pressed to form a solid.

* * * * *